(12) United States Patent
Hashimoto

(10) Patent No.: US 11,836,400 B2
(45) Date of Patent: Dec. 5, 2023

(54) DISTRIBUTED PRINTING

(71) Applicant: CANON KABUSHIKI KAISHA, Tokyo (JP)

(72) Inventor: Yasuhiko Hashimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 17/494,013

(22) Filed: Oct. 5, 2021

(65) Prior Publication Data
US 2022/0129214 A1  Apr. 28, 2022

(30) Foreign Application Priority Data
Oct. 27, 2020 (JP) .................. 2020-179685

(51) Int. Cl.
*G06F 3/12* (2006.01)
(52) U.S. Cl.
CPC .......... *G06F 3/1211* (2013.01); *G06F 3/1244* (2013.01); *G06F 3/1251* (2013.01); *G06F 3/1274* (2013.01)
(58) Field of Classification Search
None
See application file for complete search history.

(56) References Cited

U.S. PATENT DOCUMENTS

| | | | | |
|---|---|---|---|---|
| 6,930,795 B1* | 8/2005 | Motamed | ........... | G06K 15/1857 358/1.9 |
| 2005/0243365 A1* | 11/2005 | Noda | ................ | H04N 1/32545 358/1.15 |
| 2009/0147295 A1* | 6/2009 | Pandit | .................. | G06F 3/1205 358/1.15 |
| 2014/0176969 A1* | 6/2014 | Yano | ................ | G06K 15/4065 358/1.9 |
| 2015/0146224 A1* | 5/2015 | Shimamura | ........ | H04N 1/00082 358/1.13 |
| 2019/0073170 A1* | 3/2019 | Suzuki | ............... | H04N 1/00639 |

FOREIGN PATENT DOCUMENTS

JP  2009-163722 A  7/2009

* cited by examiner

*Primary Examiner* — Eric A. Rust
(74) *Attorney, Agent, or Firm* — VENABLE LLP

(57) ABSTRACT

A control method of a distribution apparatus for distributing print medium data includes specifying a first printing apparatus to be a distribution destination of first print medium data, specifying a second printing apparatus to be a distribution destination of second print medium data, executing a setting related to a distribution time, and executing a conversion process, in which second print medium data is generated by converting at least a part of first print medium data based on information related to the specified second printing apparatus, at a time based on the executed setting related to the distribution time. The first print medium data is distributed to the specified first printing apparatus based on the executed setting related to the distribution time and the second print medium data is distributed to the specified second printing apparatus based on the executed setting related to the distribution time.

20 Claims, 17 Drawing Sheets

| FILE NAME | TYPE | DISTRIBUTABLE MODEL | UPDATE DATE AND TIME |
|---|---|---|---|
| ☐ Custom-A.bin | CUSTOM PRINTING PAPER | PRODUCT A | 2020/06/10  10 : 10 |
| ☐ Custom-B.bin | CUSTOM PRINTING PAPER | PRODUCT B | 2020/06/11  10 : 10 |
| ☐ Custom-C.bin | CUSTOM PRINTING PAPER | PRODUCT C | 2020/06/12  10 : 10 |
| ☐ Custom-D.bin | CUSTOM PRINTING PAPER | PRODUCT A | 2020/06/13  10 : 10 |

1100 / 1102 / 1104 / 1106 / 1108

| ITEM | EXAMPLE OF VALUE |
|---|---|
| PRINTING APPARATUS ID | BCD8C8A0-075D-483C-8F17-6624B1AED7EE |
| PRODUCT ID | 1 |
| PRODUCT GROUP ID | 1 |
| PRODUCT NAME | PRODUCT A |
| SERIAL NUMBER | A000000000001 |
| FIRMWARE VERSION | 1.0 |
| IP ADDRESS | 192.168.0.1 |
| REFERENCE PRINTING APPARATUS | On/Off |
| DISTRIBUTION STATE | SUCCEEDED/FAILED/UNSENT, TIME |

FIG.6

| ITEM | EXAMPLE OF VALUE |
|---|---|
| PRINTING PAPER FILE ID | CDE24D2C-865A-4CCA-8C51-9EA6EB5FE18E |
| FILE NAME | Custom-A.bin |
| PRODUCT ID | 1 |
| PRODUCT GROUP ID | 1 |
| TYPE | BASIC PRINTING PAPER/CUSTOM PRINTING PAPER/BACKUP PRINTING PAPER |

FIG.7

| ITEM | EXAMPLE OF VALUE |
|---|---|
| FORMAT VERSION | 1 |
| TYPE | BASIC PRINTING PAPER/CUSTOM PRINTING PAPER/BACKUP PRINTING PAPER |
| PRODUCT ID | 1 |
| PRODUCT GROUP ID | 1 |
| PRINTING PAPER LIST | NUMBER OF PRINTING PAPER DATA, PRINTING PAPER ID, DISPLAY/NON-DISPLAY FOR EACH PRINTING PAPER ID |
| PRINTING PAPER DATA | CONTENTS OF PRINTING PAPER DATA |
| PRINTING PAPER DATA | CONTENTS OF PRINTING PAPER DATA |
| ... | CONTENTS OF PRINTING PAPER DATA |

FIG.8

| ITEM | EXAMPLE OF VALUE |
|---|---|
| FORMAT VERSION | 1 |
| TYPE | BASIC PRINTING PAPER/CUSTOM PRINTING PAPER |
| PRODUCT ID | 1 |
| PRODUCT GROUP ID | 1 |
| PRINTING PAPER ID | E9B3B71C-9027-46CC-AF4C-5C75FF035DD0 |
| CATEGORY ID | GLOSSY PAPER |
| REFERENCE PRINTING PAPER ID | DB4C5062-D488-4BE2-8A1C-2F1B4749B333 |
| PRINTING PAPER DATA NAME | CUSTOM A |
| INK USE AMOUNT | 1/2/3/4/5 |
| PRINTING PAPER CUT | AUTOMATIC/MANUAL |
| COLOR CALIBRATION | ALLOWED/NOT ALLOWED |
| PAPER FEED ADJUSTMENT VALUE | ADJUSTMENT DATA |
| HEAD HEIGHT | 1/2/3/4/5 |
| IMAGE PROCESSING DATA | IMAGE PROCESSING DATA |

FIG.9

| | FILE NAME | TYPE | DISTRIBUTABLE MODEL | UPDATE DATE AND TIME |
|---|---|---|---|---|
| ☐ | Custom-A.bin | CUSTOM PRINTING PAPER | PRODUCT A | 2020/06/10  10 : 10 |
| ☐ | Custom-B.bin | CUSTOM PRINTING PAPER | PRODUCT B | 2020/06/11  10 : 10 |
| ☐ | Custom-C.bin | CUSTOM PRINTING PAPER | PRODUCT C | 2020/06/12  10 : 10 |
| ☐ | Custom-D.bin | CUSTOM PRINTING PAPER | PRODUCT A | 2020/06/13  10 : 10 |

FIG.11

| ITEM | EXAMPLE OF VALUE |
|---|---|
| PRINTING PAPER ID | E9B3B71C-9027-46CC-AF4C-5C75FF035DD0 |
| PRINTING PAPER DATA NAME | CUSTOM A |
| SOURCE TYPE | PRINTING PAPER FILE/REFERENCE PRINTING APPARATUS |
| SOURCE ID | BCD8C8A0-075D-483C-8F17-6624B1AED7EE |
| NAME | PRODUCT A |

FIG.13

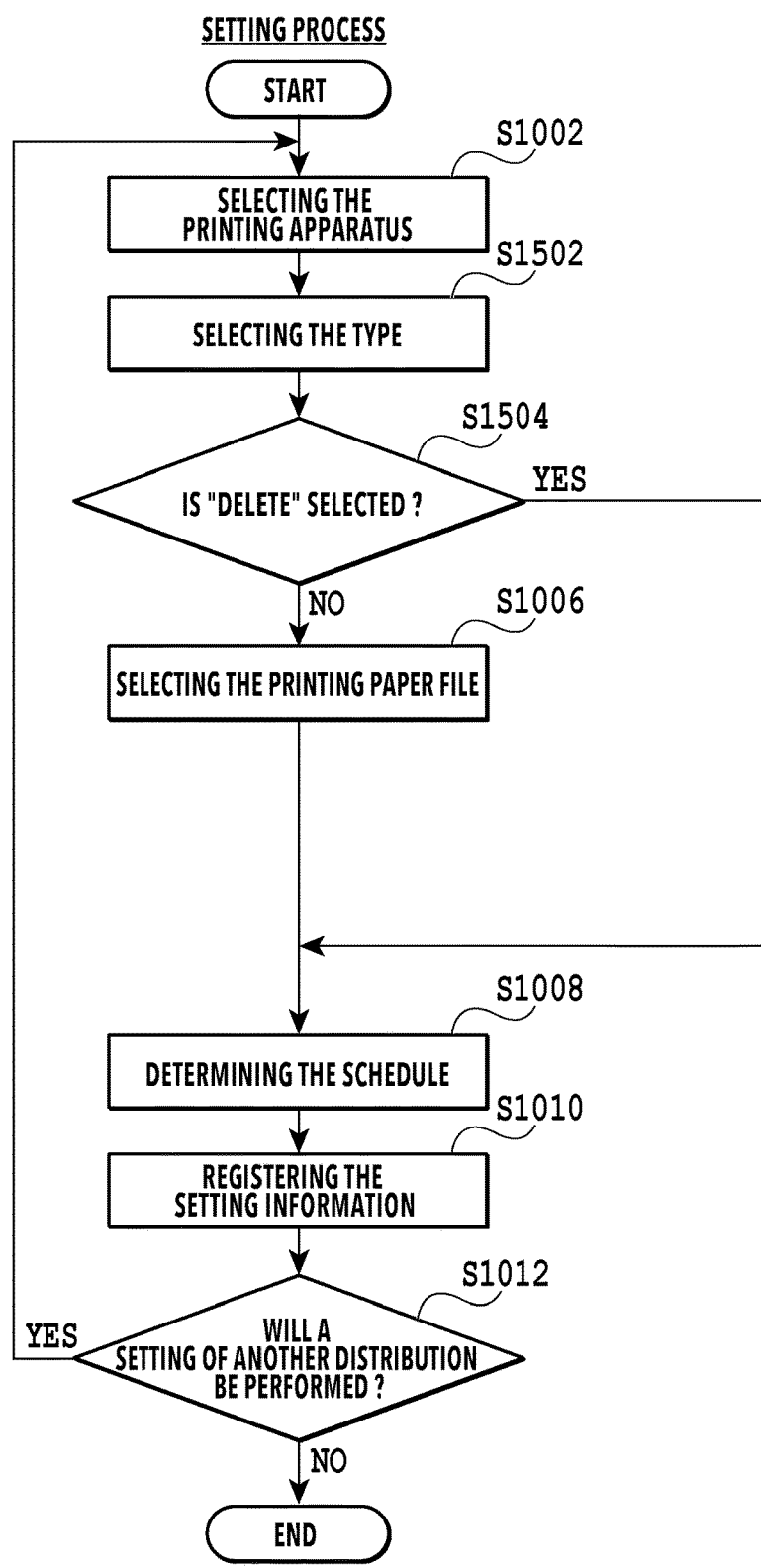

DISTRIBUTED PRINTING

BACKGROUND OF THE INVENTION

Field of the Invention

The present invention relates to a control method, storage medium, and distribution system capable of managing printing paper data for multiple printing apparatuses.

Description of the Related Art

A printing apparatus that is capable of performing printing on various types of printing paper, such as a large-format printer, holds printing paper data including various kinds of attributes and image processing data that are necessary for performing optimum printing on each type of printing paper.

Japanese Patent Laid-Open No. 2009-163722 discloses a technology for uniformly designating attributes of printing paper to multiple printers which are managed by a print shop management system.

In the meantime, there is a distribution apparatus which is capable of delivering printing paper data to a printing apparatus, in order to make the printing apparatus set the printing paper data. With the spread of distribution apparatuses that deliver printing paper data to printing apparatuses, improvement of the convenience in distribution of printing paper data to printing apparatuses has been demanded.

SUMMARY OF THE INVENTION

The present invention was made in view of the above-described problem, so as to improve the convenience in distribution of printing paper data to a printing apparatus.

In the first aspect of the present invention, there is provided a control method of a distribution apparatus, the control method including:

a specification step of specifying a printing apparatus to be a distribution destination of print medium data, which is data related to printing by use of a print medium;

a setting step of executing a setting related to a distribution time;

a processing step of executing a conversion process, in which at least a part of first print medium data is converted based on information related to the specified printing apparatus so as to generate second print medium data, at a time based on the executed setting related to the distribution time; and a distribution step of distributing the second print medium data, which is generated in the conversion process, to the specified printing apparatus at a time based on the executed setting related to the distribution time.

In the second aspect of the present invention, there is provided a non-transitory computer readable storage medium storing a program for causing a computer to perform a control method, the control method including:

a specification step of specifying a printing apparatus to be a distribution destination of print medium data, which is data related to printing by use of a print medium;

a setting step of executing a setting related to a distribution time;

a processing step of executing a conversion process, in which at least a part of first print medium data is converted based on information related to the specified printing apparatus so as to generate second print medium data, at a time based on the executed setting related to the distribution time; and a distribution step of distributing the second print medium data, which is generated in the conversion process, to the specified printing apparatus at a time based on the executed setting related to the distribution time.

In the third aspect of the present invention, there is provided a distribution system including a distribution apparatus and a printing apparatus, the distribution system including:

a specification unit configured to specify the printing apparatus to be a distribution destination of print medium data, which is data related to printing by use of a print medium:

a setting unit configured to execute a setting related to a distribution time;

a processing unit configured to execute a conversion process, in which at least a part of first print medium data is converted based on information related to the specified printing apparatus so as to generate second print medium data, at a time based on the executed setting related to the distribution time;

a distribution unit configured to distribute the second print medium data, which is generated in the conversion process, to the specified printing apparatus at a time based on the executed setting related to the distribution time; and a printing unit configured to execute printing based on the setting of the print medium.

According to the present invention, it becomes possible to improve the convenience in distribution of printing paper data to a printing apparatus.

Further features of the present invention will become apparent from the following description of exemplary embodiments with reference to the attached drawings.

BRIEF DESCRIPTION OF THE DRAWINGS

FIG. 6 is a diagram illustrating apparatus identification information for identifying the printing apparatus;

FIG. 7 is a diagram illustrating file identification information for identifying a printing paper file;

FIG. 8 is a diagram illustrating information included in the printing paper file;

FIG. 9 is a diagram illustrating information included in printing paper data;

FIG. 11 is a diagram illustrating a management screen for setting information;

FIG. 13 is a diagram illustrating data identification information for identifying the printing paper data;

FIG. 15 is a diagram showing a relation between FIGS. 15A and 15B;

FIGS. 15A and 15B are flowcharts illustrating details of processing of a setting process of another embodiment.

DESCRIPTION OF THE EMBODIMENTS

Hereinafter, with reference to the attached drawings, a detailed explanation will be given of an example of an embodiment of a control method, a distribution system (hereinafter also referred to as a management system), and a storage medium. Note that the following embodiments do not limit the present invention, and every combination of the characteristics explained in the embodiments is not necessarily essential to the solutions in the present invention. In addition, the relative positions, shapes, etc., of the constituent elements described in the embodiments are merely examples and, unless otherwise specified, do not limit the range of this invention as such.

Note that, in the following explanations, "printing" includes, not only a case of forming meaningful information such as a letter or a figure, but also a case of forming an image, a design, a pattern, etc., on a print medium in a broad sense regardless of being meaningful or meaningless or a case of processing a medium. Further, as for "printing", whether to be actualized in such a manner that a human can visually perceive or not does not matter. Furthermore, although it is assumed that the "print medium" is printing paper in the embodiments, it is also possible to use a cut sheet, a cloth, a plastic film, etc.

First Embodiment

First, with reference to FIG. 1 through FIG. 12, an explanation will be given of a management system (hereinafter also referred to as a distribution apparatus) equipped with a management apparatus according to the first embodiment.

(Configuration of the Management System)

Figure 1:
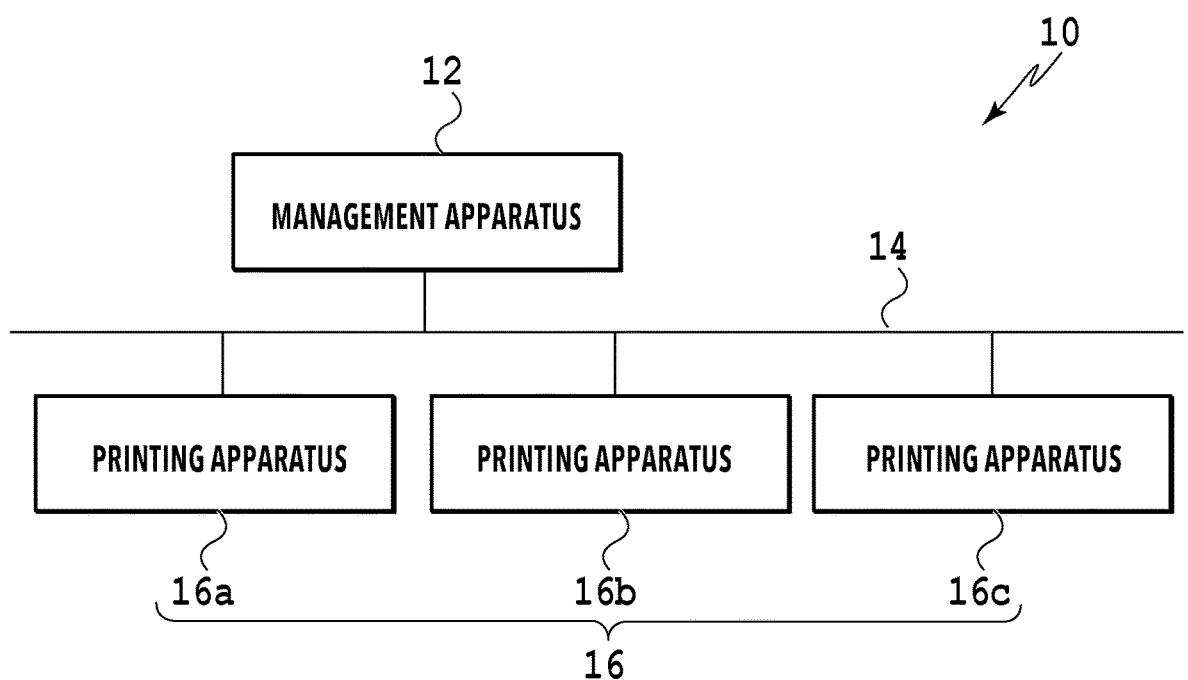
FIG. 1 is a block configuration diagram of a management system equipped with a management apparatus of an embodiment.

FIG. 1 is a block configuration diagram of the management system equipped with the management apparatus according to an embodiment. In the management system 10 of FIG. 1, the management apparatus 12 is connected to the printing apparatuses 16 via the network 14. The management apparatus 12 is, for example, an information processing apparatus such as a server or a general-purpose personal computer. Note that the explanation will be given on the assumption that the management apparatus 12 is configured with one information processing apparatus in the present embodiment, there is no limitation as such. It is also possible that the management apparatus 12 is configured with multiple information processing apparatuses, so that the below-explained processing to be executed by the management apparatus 12 is executed in a linked or shared manner by the multiple information processing apparatuses. The management apparatus 12 manages multiple printing paper data to be used by the printing apparatuses 16. The printing paper data is an attribute or image processing data that is necessary for printing and is set for each paper type such as plain paper and glossy paper or, in other words, information including information related to printing according to paper types.

The management system 10 is equipped with multiple printing apparatuses 16. In the present embodiment, one management system 10 includes three printing apparatuses 16a, 16b, and 16c, each of which is connected to the management apparatus 12 via the network 14. On the printing paper designated by a print job which is input to the printing apparatus 16, the printing apparatus 16 performs printing by use of the printing paper data corresponding to the designated printing paper, out of the printing paper data that is set in itself. For example, it is assumed that the paper types that can be used by the printing apparatus 16 are plain paper and glossy paper. In this situation, in a case where the printing apparatus 16 performs printing on plain paper (in a case where the designated printing paper is plain paper), printing is performed by use of printing paper data corresponding to plain paper. Similarly, in a case where the printing apparatus 16 performs printing on glossy paper (in a case where the designated printing paper is glossy paper), printing is performed by use of printing paper data corresponding to glossy paper. In this way, the printing apparatus 16 performs printing by use of printing paper data corresponding to the paper type to be used for printing, out of multiple printing paper data corresponding to paper types.

In the present embodiment, it is assumed that the printing apparatuses 16a, 16b, and 16c are, for example, inkjet printers that can output a printed product in a large-format size by performing printing on roll paper and then cutting the roll paper. However, there is no limitation to this form, and, for example, it is also possible to use printers that can perform printing on printing paper which is a standard-sized sheet (cut sheet), not roll paper. Further, the printing method of the printing apparatuses 16 is not limited to an inkjet system and may be, for example, an electrophotographic system or a thermal sublimation system. Further, the printing apparatuses 16a, 16b, and 16c may have the same configuration as each other or have different configurations from each other. For example, even in a case where all of the printing apparatuses 16a, 16b, and 16c are inkjet printers that can output a printed product in a large-format size, it is possible that the types, model numbers, and printing abilities (corresponding printing paper, ink, etc.) of the respective apparatuses are different. More specifically, for example, it is also possible that the printing apparatus 16a can perform printing on roll paper having a width of 60 inches by use of twelve colors of ink, and the printing apparatus 16b and 16c can perform printing on roll paper having a width of 44 inches by use of twelve colors of ink. Further, for example, it is also possible that the printing apparatus 16a can perform printing by use of twelve colors of ink, the printing apparatus 16b can perform printing by use of eight colors of ink, and the printing apparatus 16c can perform printing by use of five colors of ink.

It is also possible that the management system 10 has such a form in which the function of the management apparatus 12 is held by any of the printing apparatuses 16a, 16b, and 16c. Further, the number of printing apparatuses 16 connected to the management apparatus 12 (the number of printing apparatuses 16 included in the management system 10) is not limited to three. Further, the printing apparatuses 16 are not limited to printers that simply perform printing based on information which is input from the outside, and the printing apparatuses 16 may be various publicly-known apparatuses that can perform printing on a print medium, such as multifunction peripherals having a function of copying information that is read by an installed reading apparatus.

<Hardware Configuration of the Printing Apparatus>

Figure 2:
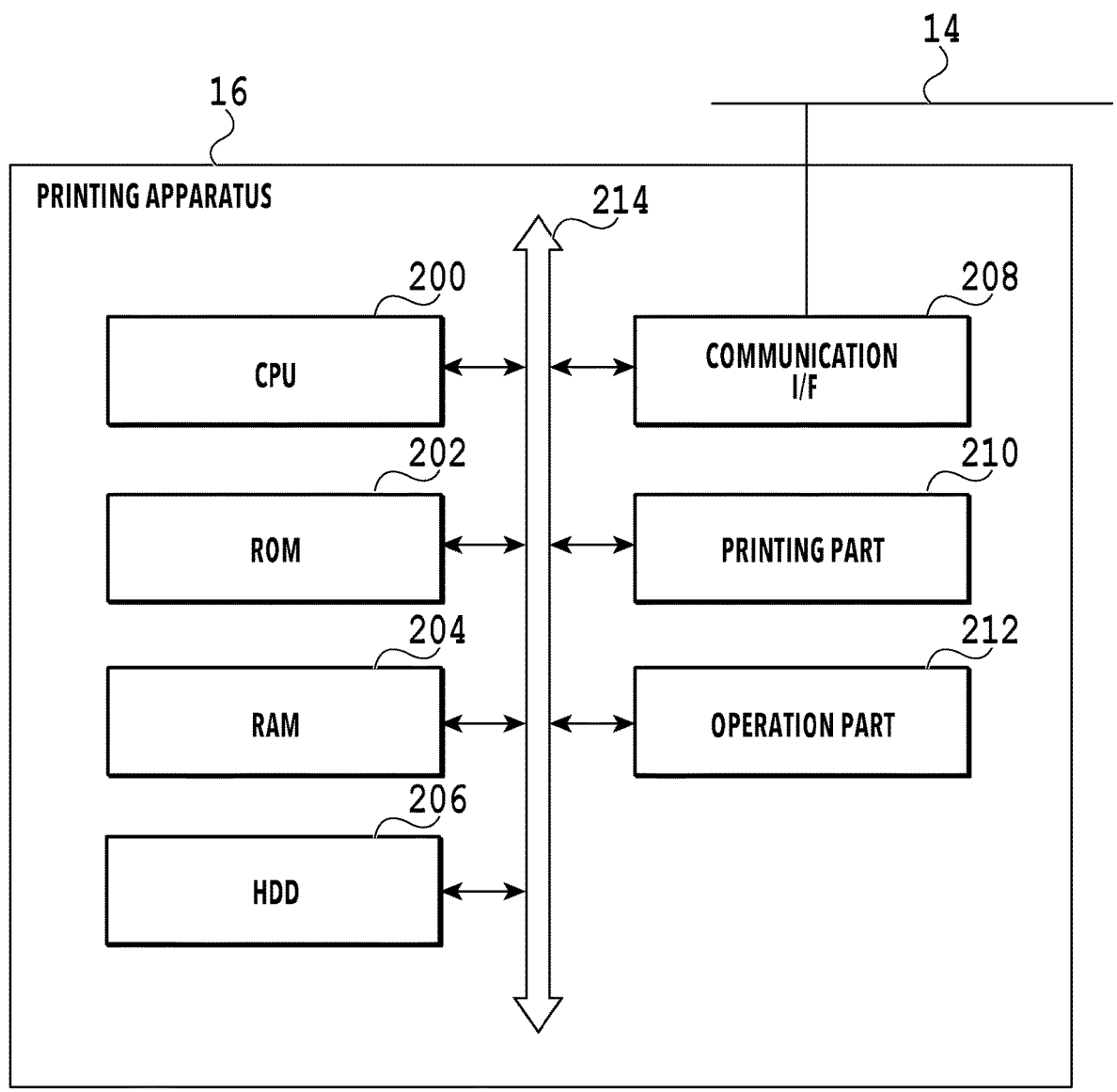
FIG. 2 is a block diagram of the hardware configuration of a printing apparatus.

FIG. 2 is a block diagram of the hardware configuration of the printing apparatus 16. The printing apparatus 16 includes the CPU 200, the ROM 202, the RAM 204, the HDD 206, the communication interface (I/F) 208, the printing part 210, and the operation part 212. The CPU 200 is connected to each of the above-described configurations via the system bus 214, and each of the configurations is controlled by the CPU 200.

The operation of the CPU 200 is based on a control program stored in the ROM 202 or the HDD 206. The CPU 200 outputs an image signal as output information to the printing part (printer engine) 210 via the system bus 214. Further, the CPU 200 is capable of communicating with the management apparatus 12 via the communication I/F 208, sending information of the printing apparatus 16 to the management apparatus 12, and receiving information which is output from the management apparatus 12. Further, the CPU 200 is connected to, for example, a host apparatus (not illustrated in the drawings) via the communication I/F 208 and can receive a print job which is output from the host apparatus via the communication I/F 208.

The RAM 204 functions as a main memory, a work area, etc., of the CPU 200. The RAM 204 is configured so that the memory capacity can be expanded by an optional RAM connected to an expansion port. Further, the RAM 204 is used as an output information rendering area, an environment data storage area, etc., for printing based on a print job.

The HDD (Hard Disk Drive) 206 stores information such as font data and printing paper data. Based on information that is output from the CPU 200, the printing part 210 ejects ink from the head to the printing paper so as to print an image. The operation part 212 is a configuration for operating the printing apparatus 16, such as a touch panel. The user can operate the touch panel to execute various kinds of settings and the like for the printing apparatus 16.

<Software Configuration of the Printing Apparatus>

Figure 3:
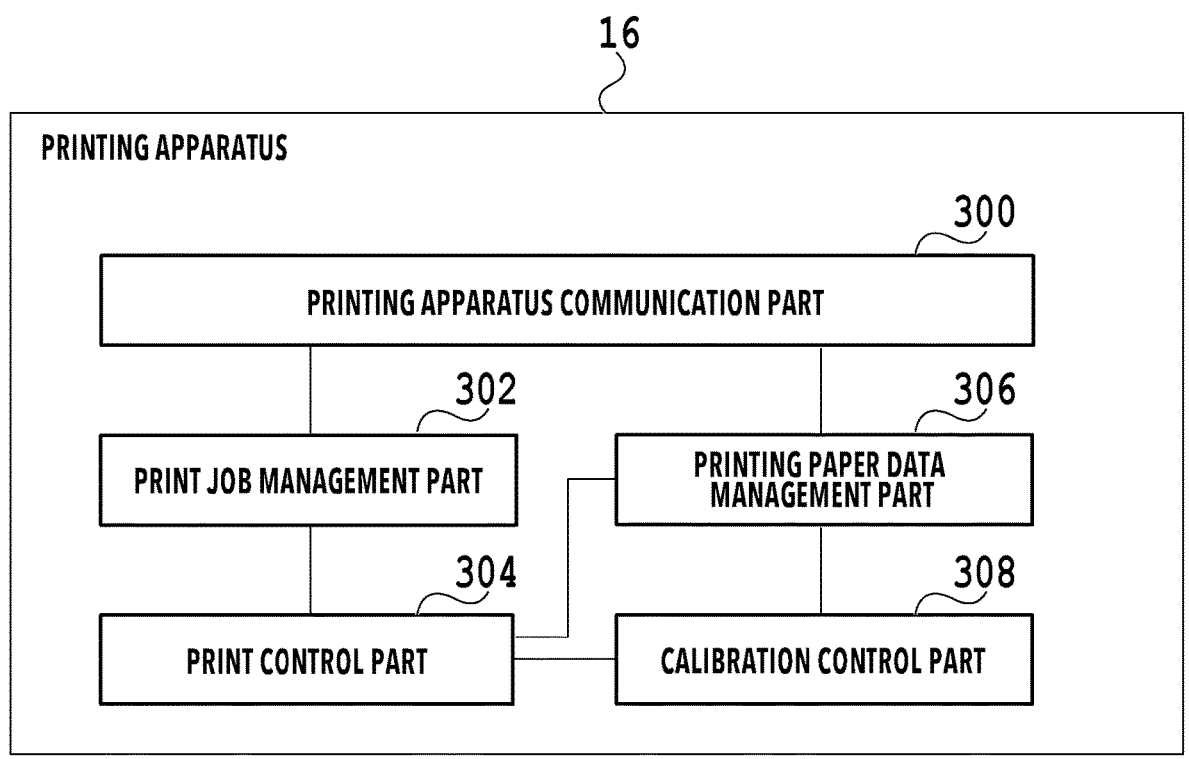
FIG. 3 is a block diagram of the software configuration of the printing apparatus.

FIG. 3 is a block diagram illustrating the software function configuration of the printing apparatus 16. The printing apparatus 16 includes the printing apparatus communication part 300, the print job management part 302, the print control part 304, the printing paper data management part 306, and the calibration control part 308.

The printing apparatus communication part 300 sends and receives communication data to and from the management apparatus 12 and receives print job data (hereinafter also simply referred to as a "print job") sent from a host apparatus, which is not illustrated in the drawings, via the network 14. The print job management part 302 spools all of the received print job data and then transfers the received print jobs to the print control part 304. Further, the print job management part 302 controls printing based on print jobs such as controlling a printing order, canceling printing, and pausing printing, via the print control part 304. Note that such a form in which the print job management part 302 sequentially transfers received print jobs to the print control part 304 is also possible.

The print control part 304 performs control so as to perform printing on printing paper, which is a print medium, based on a print job transferred from the print job management part 302. Further, the print control part 304 executes calibration based on information which is output from the calibration control part 308.

The printing paper data management part 306 manages printing paper data including information related to printing corresponding to paper types. The printing paper data managed by the printing paper data management part 306 is stored in a storage area such as the ROM 202 or the HDD 206. The printing paper data management part 306 adds, updates, restores, and deletes the managed printing paper data, based on information which is output from the management apparatus 12. The adding is a process of newly adding/setting the printing paper data according to an instruction from the management apparatus 12 as the printing paper data to be managed by the printing paper data management part 306. The updating is a process of updating the contents of the printing paper data which has already been managed by the printing paper data management part 306 to the contents according to an instruction from the management apparatus 12. The restoring is a process of restoring the printing paper data according to an instruction from the management apparatus 12, out of the printing paper data that had been managed by the printing paper data management part 306 (deleted printing paper data), as the printing paper data to be managed by the printing paper data management part 306. The deleting is a process of deleting the printing paper data according to an instruction from the management apparatus 12, out of the printing paper data managed by the printing paper data management part 306, so as to make that printing paper data not be managed by the printing paper data management part 306.

The printing paper data includes a group of mechanical parameters, a target value for calibration, a condition for executing calibration, and image processing data required for image processing, which are to be used for executing printing/conveying for the printing paper corresponding to the printing paper data. The group of mechanical parameters includes information such as the height of the head during printing, the paper feed adjustment value during conveyance of printing paper, etc. Further, the target value for calibration is a value which is to be the target of correction in a case where calibration is executed in the printing apparatus 16. The image processing data is information such as various kinds of parameters required for image processing such as color conversion. One printing paper data is prepared for each paper type. In other words, one printing paper data corresponds to printing paper of one paper type.

The calibration control part 308 controls the print control part 304 to execute calibration. Each part in the above-described software configuration of the printing apparatus 16 can be configured as a program module. In that case, each program module is stored in the ROM 202 or the HDD 206. Each program module that is read out into the RAM 204 by the CPU 200 is controlled and executed by the CPU 200.

<Hardware Configuration of the Management Apparatus>

Figure 4:
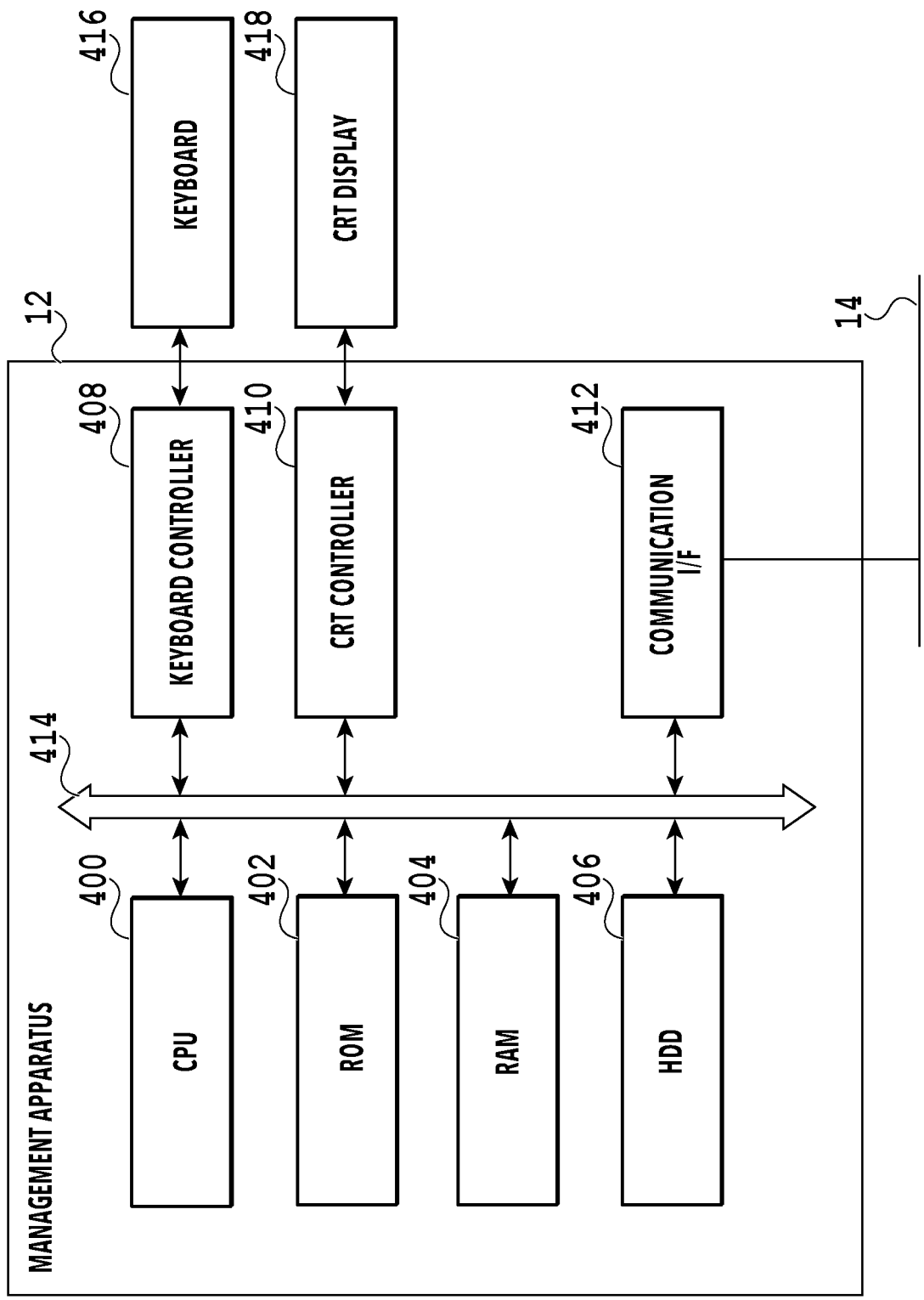
FIG. 4 is a block diagram of the hardware configuration of the management apparatus.

FIG. 4 is a block diagram of the hardware configuration of the management apparatus 12. The management apparatus 12 includes the CPU 400, the ROM 402, the RAM 404, the HDD 406, the keyboard controller 408, the CRT controller 410, and the communication I/F 412. The CPU 400 is connected to each configuration via the system bus 414, and, in the present embodiment, each configuration is controlled by the CPU 400 unless otherwise specified. Further, to the management apparatus 12, the keyboard 416 that can be operated by the user and the CRT display 418 for displaying various kinds of information are connected.

The CPU 400 reads out various kinds of programs, such as a control program, a system program, and an application program stored in the ROM 402 or the HDD 406, into the RAM 404. Furthermore, the CPU 400 executes various kinds of programs read out into the RAM 404, so as to perform various kinds of data processing. It is also possible that the CPU 400 is a dedicated circuit such as an ASIC. The CPU 400 temporarily saves various kinds of data, which are held in the HDD 406, in the RAM 404. Further, the CPU 400 performs processing on various kinds of data temporarily saved in the RAM 404 and sends the processed data to the printing apparatus 16 via the communication I/F 412.

The RAM 404 functions as a main memory, a work area, etc., of the CPU 400. Further, the RAM 404 is configured so that its capacity can be expanded by an optional RAM connected to an expansion port, etc. The keyboard controller 408 controls input from the keyboard 416, a pointing device (not illustrated in the drawings) connected to the management apparatus 12, etc. The CRT controller 410 controls the display of the CRT display 418. Note that, although the CRT display 418 is used as a display device in the present embodiment, there is no limitation as such, and various publicly-known display devices can be used as the display device, such as a liquid crystal display device.

<Software Configuration of the Management Apparatus>

Figure 5:
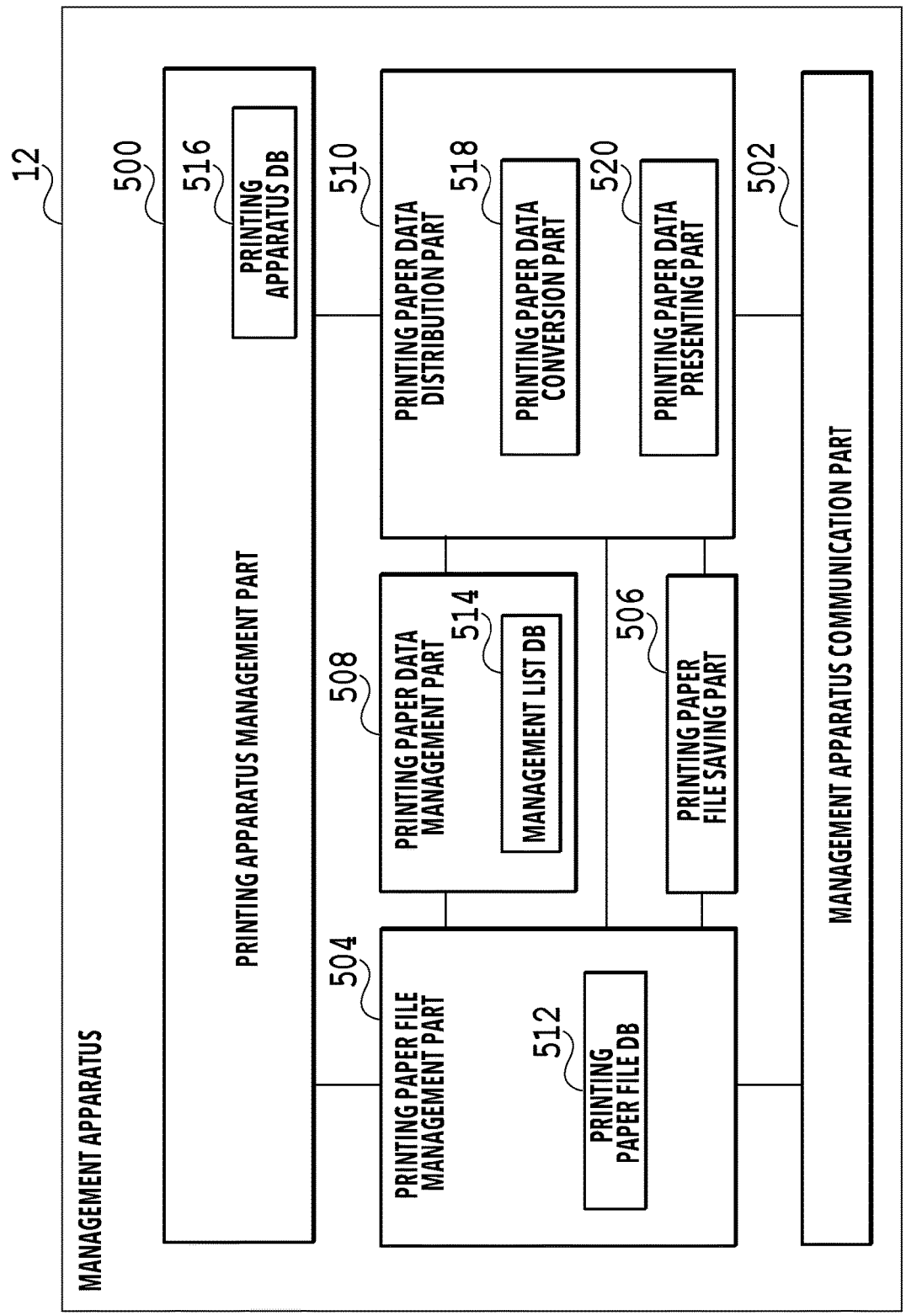
FIG. 5 is a block diagram of the software configuration of the management apparatus.

FIG. 5 is a block diagram of the software function configuration of the management apparatus 12. The programs that controls the software functions are held in a memory included in the management apparatus 12. The management apparatus 12 includes the printing apparatus management part 500, the management apparatus communication part 502, the printing paper file management part 504, the printing paper file saving part 506, the printing paper data management part 508, and the printing paper data distribution part 510.

The management apparatus communication part 502 sends and receives various kinds of data to and from the printing apparatus 16 via a network. Further, the management apparatus communication part 502 searches for the printing apparatus 16, which is connected via the network 14, by use of a search protocol such as an SNMP protocol, based on an instruction from the printing apparatus management part 500. The search protocol is not limited to the SNMP protocol, and any protocol that can search for the printing apparatus 16 may be used.

The printing apparatus management part 500 manages the printing apparatuses 16 which are connected to the management apparatus 12 via the network 14. Specifically, each of the printing apparatuses 16 is managed in an identifiable manner in the printing apparatus database (DB) 516 (which will be described later) by use of apparatus identification information for identifying the printing apparatuses 16. The printing apparatus management part 500 generates a list of access destination information such as IP addresses of the printing apparatuses 16, which are obtained via the management apparatus communication part 502, and manages the list in the printing apparatus DB 516.

The printing paper file management part 504 manages a printing paper file which includes one or more printing paper data to be distributed to the printing apparatuses 16. A printing paper file includes at least one or more printing paper data. Specifically, the printing paper file management part 504 manages each printing paper file in an identifiable manner in the printing paper file DB 512 (which will be described later) by use of file identification information for identifying printing paper files. Further, the printing paper file management part 504 saves multiple information including printing paper data in the printing paper file saving part 506.

The printing paper file saving part 506 holds the printing paper files. Note that, since the printing paper files include printing paper data, the printing paper data is also held in the printing paper file saving part 506. The printing paper file saving part 506 is, for example, a predetermined folder in a file system of the operating system of the management apparatus 12. The printing paper data management part 508 manages the printing paper data included in the printing paper files, which are managed in the printing paper file management part 504, and the printing paper data held in the printing apparatuses 16. Specifically, each printing paper data is managed in an identifiable manner in the management list DB 514 (which will be described later) by use of the data identification information for identifying printing paper data.

The printing paper data distribution part 510 performs setting for distribution of the printing paper data, which is selected from the printing paper files, etc., on the printing apparatus 16 whose access destination information, etc., are managed in the printing apparatus management part 500, and the printing paper data distribution part 510 distributes information according to the setting. Further, for adding, updating, and restoring printing paper data, the printing paper data distribution part 510 includes the printing paper data conversion part 518 that converts the printing paper data to be distributed to the target printing apparatuses 16 so that the printing paper data becomes compatible with the printing apparatuses 16. The conversion process executed by the printing paper data conversion part 518 will be described later. Further, for deleting printing paper data, the printing paper data distribution part 510 includes the printing paper data presenting part 520 that presents the printing paper data to be deleted in a selectable manner.

Each part in the software configuration of the management apparatus 12 can be configured as a program module. In that case, each program module is stored in the ROM 402 or the HDD 406. Each program module that is read out into the RAM 404 by the CPU 400 is controlled and executed by the CPU 400.

<Printing Apparatus DB>

Next, the printing apparatus DB 516 which is managed by the printing apparatus management part 500 of the management apparatus 12 will be explained. FIG. 6 is a diagram illustrating apparatus identification information for identifying the printing apparatus 16, which is held in the printing apparatus DB 516.

The apparatus identification information 600 held in the printing apparatus DB 516 holds the printing apparatus ID 602, the product ID 604, the product group ID 606, the product name 608, and the serial number 610. Further, the apparatus identification information 600 includes the firmware version 612, the IP address 614, the reference printing apparatus 616, and the distribution state 618. That is, the printing apparatus management part 500 manages all the printing apparatuses 16 to be the management target of the management apparatus 12 in an identifiable manner based on the apparatus identification information 600 including the above-described information. Note that the information included in the apparatus identification information 600 is not limited to the above-described information, and the kinds thereof thereof may be increased or decreased as appropriate.

The printing apparatus ID 602 is an ID that can uniquely identify the printing apparatus 16 in the printing apparatus DB 516 and is, for example, a GUID (Globally Unique Identifier). The product ID 604 is an ID that can identify the product of the printing apparatus 16. For example, "1" is set for the printing apparatus 16 capable of performing printing on printing paper having a roll width of 60 inches by use of twelve ink colors, and "2" is set for the printing apparatus 16 capable of performing printing on printing paper having a roll width of 44 inches by use of twelve ink colors. The product ID 604 is a value held in advance in each printing apparatus 16.

The product group ID 606 is an ID that can identify the product group of the printing apparatus 16. For example, "1" is set for the printing apparatus 16 having twelve colors, and "2" is set for the printing apparatus 16 having eight colors. The product group ID 606 is also a value held in advance in the printing apparatus 16 as with the product ID 604. The product name 608 is information that can be recognized as a character string corresponding to the product ID 604. For example, "PRODUCT A" is set. The serial number 610 is an ID that can uniquely identify an individual printing apparatus 16. The product name 608 and the serial number 610 are also information held in advance in the printing apparatus 16 as with the product ID 604, etc.

The firmware version 612 is information indicating the version of the firmware running on the printing apparatus 16. The firmware version 612 is updated if the firmware is updated in the printing apparatus 16. The IP address 614 is an IP address, which is access destination information of the printing apparatus 16. The reference printing apparatus 616 is information designating whether or not the printing paper data in the printing apparatus 16 is managed by the printing paper data management part 508. If the reference printing apparatus 616 is "ON", the printing paper data thereof is managed by the printing paper data management part 508 (included in the management list DB 514), and, if the reference printing apparatus 616 is "OFF", the printing paper data thereof is not managed by the printing paper data management part 508 (not included in the management list DB 514).

The distribution state 618 indicates the execution result and time of distribution of the printing paper data. If the printing paper data has never been delivered, "UNDISTRIBUTED" is registered, and the time is not registered. Further, in a case where the distribution of the printing paper data succeeded or failed, "SUCCEEDED" or "FAILED" is registered as the distribution result, respectively, and the time when the distribution is executed is registered.

<Printing Paper File DB>

Next, the printing paper file DB 512 which is managed by the printing paper file management part 504 of the management apparatus 12 will be explained. FIG. 7 is a diagram illustrating the file identification information for identifying a printing paper file, which is held in the printing paper file DB 512.

The file identification information 700 held in the printing paper file DB 512 includes the printing paper file ID 702, the file name 704, the product ID 706, the product group ID 708, and the type 710. That is, the printing paper file management part 504 manages printing paper files in an identifiable manner based on the file identification information 700 including the above-described information. Note that the information included in the file identification information 700 is not limited to the above-described information, and the kinds thereof may be increased or decreased as appropriate.

The printing paper file ID 702 is an ID with which the printing paper file can be uniquely recognized in the printing paper file DB 512 and is, for example, a GUID. The file name 704 is the name of the printing paper file. The product ID 706 is information obtained by copying the product ID 806 (which will be described later) of the printing paper file. The product group ID 708 is information obtained by copying the product group ID 808 (which will be described later) of the printing paper file. The type 710 is information obtained by copying the type 804 of the printing paper file.

<Printing Paper File>

Next, the printing paper file saved in the printing paper file saving part 506 will be explained. As described above, the printing paper file saved in the printing paper file saving part 506 is managed in the printing paper file DB 512 of the printing paper file management part 504 by use of the file identification information 700. FIG. 8 is a diagram illustrating the information included in a printing paper file. The information of a given printing paper file is illustrated in FIG. 8. Further, the printing paper file of FIG. 8 is a file which is uniquely identified with the printing paper file ID of FIG. 7.

The printing paper file includes the format version 802, the type 804, the product ID 806, the product group ID 808, the printing paper list 810, and the printing paper data 812. The information included in the printing paper file is not limited to the above information only, and the kinds thereof may be increased or decreased as appropriate.

The format version 802 is information indicating the format version of the printing paper file. The type 804 is information indicating the type of the printing paper file. The type 804 is categorized into "BASIC PRINTING PAPER", "CUSTOM PRINTING PAPER", and "BACKUP PRINTING PAPER". "BASIC PRINTING PAPER" is a printing paper file provided by the manufacturer of the printing apparatus 16. "CUSTOM PRINTING PAPER" is a printing paper file including the printing paper data in which the information such as an attribute included in the printing paper data has been customized by the user who utilizes the printing apparatus 16, based on the printing paper data of the printing paper file whose type 804 is "BASIC PRINTING PAPER". "BACKUP PRINTING PAPER" is a printing paper file obtained by backing up all of the printing paper data that are set in the printing apparatus 16 at the timing where the management apparatus 12 executes a backup process. Note that the backup process is a process to be executed at a given timing according to an instruction from the management apparatus 12 or an instruction from the printing apparatus 16 and is a process in which communication related to the printing paper data that is set in the printing apparatus 16 is executed between the management apparatus 12 and the printing apparatus 16.

The product ID 806 is an ID that can identify a group of printing apparatuses 16 that can directly utilize this printing paper file without executing a conversion process. That is, the apparatuses included in the group may be any printing apparatus 16 that can directly utilize this printing paper file without executing the conversion process, and thus the model numbers and types may be different from each other. The product ID 806 is represented in the same manner as the product ID 604. The product group ID 808 is an ID that can identify a product group of printing apparatuses 16 that can utilize this printing paper file by executing a conversion process or can directly utilize this printing paper file without executing a conversion process. The group identified by the product group ID 808 is categorized according to, for example, the number of colors that can be used for printing and the type of colors that can be used for printing. For example, a group of apparatuses that can use twelve colors for printing and a group of apparatuses that can use only five colors for printing are distinguished from each other. Further, for example, among the groups of apparatuses that can use twelve colors for printing, the groups are categorized according to the types of colors included in the twelve colors. The product group ID 808 is represented in the same manner as the product group ID 606. The printing paper list 810 indicates the number of printing paper data included in this printing paper file, the printing paper IDs 910 (which will be described later), and a display/non-display attribute for each printing paper ID 910. This display/non-display attribute is information that designates whether or not to display the printing paper data on the operation part 212 of the printing apparatus 16. The printing paper data 812 is printing paper data for one paper type. Details of printing paper data will be described later.

<Printing Paper Data>

Next, printing paper data for one paper type, which is included in a printing paper file, will be explained. The printing paper data includes various kinds of parameters as attributes necessary for performing printing on a target paper type and image processing data to be used at the time of image processing. FIG. 9 is a diagram illustrating the information included in printing paper data.

The printing paper data includes the format version 902, the type 904, the product ID 906, the product group ID 908, the printing paper ID 910, the category ID 912, the reference printing paper ID 914, and the printing paper data name 916. The printing paper data further includes the ink use amount 918, the printing paper cut 920, the color calibration 922, the paper feed adjustment value 924, the head height 926, and the image processing data 928. Note that the above-described various kinds of information are examples of information included in printing paper data, and the information included in printing paper data is not limited as such.

The format version 902 indicates the format version of the printing paper data. The type 904 indicates the type of the printing paper data. The types are "BASIC PRINTING PAPER" and "CUSTOM PRINTING PAPER". As for the printing paper data included in a printing paper file of which the type 804 is "BASIC PRINTING PAPER", the type 904 is "BASIC PRINTING PAPER". Further, the type 904 of the printing paper data customized by the user is "CUSTOM PRINTING PAPER". Note that "BACKUP PRINTING PAPER" among the types 804 of printing paper files is not used for the type 904. In the present embodiment, it is assumed that, among the above-described items included in printing paper data, the user can customize (change) the items 916 to 926, and the other items cannot be customized. In a case where the user customizes any item among the printing paper data included in a printing paper file of "BASIC PRINTING PAPER", the printing paper file is set as a file of "CUSTOM PRINTING PAPER" and newly saved. Accordingly, a printing paper file of "CUSTOM PRINTING PAPER" is newly generated.

The product ID 906 is an ID that can identify the printing apparatus 16 that can utilize this printing paper data, and the product ID 906 matches the product ID 806 of the printing paper file. The product ID 906 is represented in the same manner as the product ID 604. The product group ID 908 is an ID that can identify the product group of the printing apparatuses 16 that can utilize this printing paper data, and the product group ID 908 matches the product group ID 808 of the printing paper file. The product group ID 908 is displayed in the same manner as the product group ID 606.

The printing paper ID 910 is an ID that uniquely identifies the paper type of this printing paper data and is, for example, a GUID. Further, for example, in a case where an item included in printing paper data is customized by the user, an ID for identifying the printing paper data generated by the customization is set for this item. The category ID 912 is information indicating the category of this printing paper, i.e., the paper type. In FIG. 9, the printing paper is categorized as "GLOSSY PAPER". The reference printing paper ID 914 is information for determining the base printing paper data for the customization of printing paper data and indicates the printing paper ID of the base printing paper data. Therefore, the reference printing paper ID 914 is information registered for the printing paper data of which the type 904 is "CUSTOM PRINTING PAPER" and is blank for the printing paper data of which the type 904 is "BASIC PRINTING PAPER". The printing paper data name 916 is the name of this printing paper data and is displayed on the operation part 212 of the printing apparatus 16.

The ink use amount 918 is a value indicating the ink ejection amount. The printing paper cut 920 is information indicating a method of cutting the roll paper at the time of performing printing by use of roll paper. In the present embodiment, "AUTOMATIC" for automatic cutting and "MANUAL" for manual cutting are set. The color calibration 922 is information indicating whether or not the color calibration can be executed. For example, "ALLOWED" is set for a paper type that can appropriately reflect the characteristics of the head that ejects ink, and "NOT ALLOWED" is set for the other paper types. The paper feed adjustment value 924 is information indicating an adjustment value of the printing paper feeding amount according to the paper thickness, friction, etc. The head height 926 is information indicating an adjustment value of the head height according to the paper thickness. The image processing data 928 indicates image processing data such as various kinds of parameters to be used for image processing such as color conversion.

Information such as the paper feed adjustment value 924, the head height 926, and the image processing data 928 changes according to the printing mechanism of the printing apparatus 16, the characteristics of the head, the characteristics of the ink to be used, etc. That is, such information is information unique to each product ID 906, printing paper ID 910, or reference printing paper ID 914. In other words, such information is determined by the combination of the type of printing paper corresponding to printing paper data and the type or group of the printing apparatus to which the printing paper data is distributed (set). Therefore, printing paper data includes a setting indicating the printing apparatus that the printing paper data is compatible with, so that the information as described above is determined according to the set printing apparatus (or the group thereof). Further, in a case where the printing paper data is distributed to a printing apparatus that does not correspond to the set printing apparatus (or the group thereof), the information as described above is converted (a conversion process is executed) so as to become compatible with the printing apparatus of the distribution destination. Note that, depending on the type of the printing apparatus of the distribution destination, the management apparatus 12 cannot convert the printing paper data so as to become compatible with the printing apparatus of the distribution destination. Specifically, the management apparatus 12 cannot convert the printing paper data so as to become applicable to the printing apparatus that does not correspond to the product group ID which is set in the printing paper data. Therefore, the printing paper data is controlled so as not to be distributed to such a printing apparatus. Note that the printing paper data converted in the conversion process is separated from the printing paper data before the conversion and saved in a memory of the management apparatus 12. In other words, even if the conversion process is performed, the printing paper data before the conversion is maintained in the memory of the management apparatus 12. Further, although the printing paper data after the conversion, which is generated in the conversion process, is deleted after being distributed to a printing apparatus, the printing paper data before the conversion is maintained without being deleted. For optimal printing, for example, as for the above-described information which depends on at least one of the mechanism of the printing apparatus 16, the characteristics of the head, and the characteristics of the ink, different printing paper data is used for each product ID.

<Setting Process>

In the above configuration, it is possible for the user to newly add (newly set) printing paper data for the printing apparatus 16, update an already-set printing paper data, or restore deleted printing paper data via the management apparatus 12. Specifically, first, what kind of printing paper data is to be distributed to which printing apparatus 16 in which type (adding, updating, or restoring) is set in the setting process. Thereafter, based on the setting contents in the setting process, the distribution process of distributing the set printing paper data to the target printing apparatus 16 is performed. Hereinafter, the setting process and the distribution process will be explained in detail. Note that, before executing the setting process, the user registers various kinds of printing paper files in the printing paper file DB 512 and the printing paper file saving part 506 of the management apparatus 12.

Figure 10:
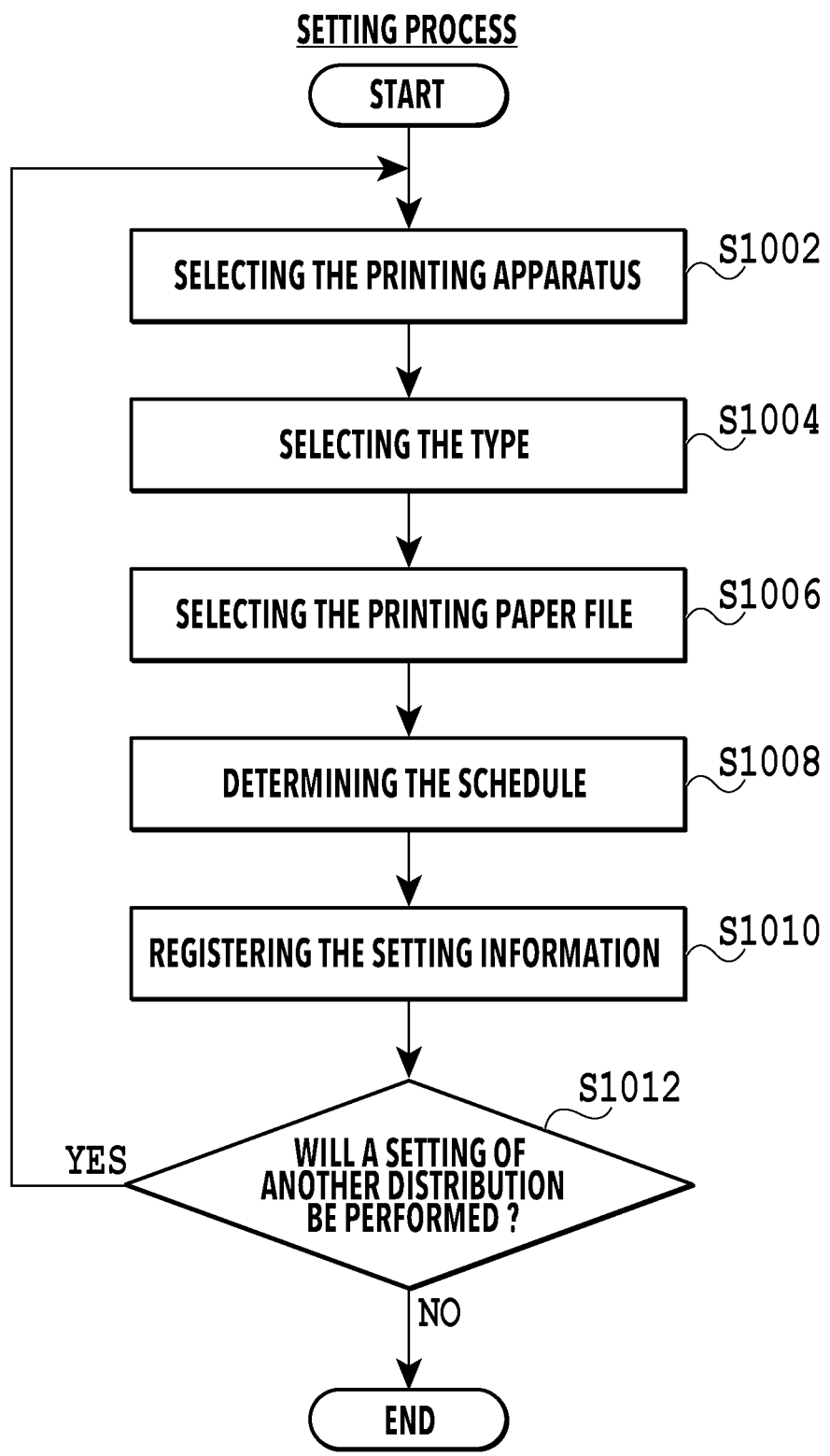
FIG. 10 is a flowchart illustrating details of processing of a setting process.

FIG. 10 is a flowchart illustrating details of processing of the setting process. The series of the processes illustrated in the flowchart of FIG. 10 is performed by the CPU 400 loading a program code stored in the ROM 402 (or the HDD 406) into the RAM 404 and executing the program code. Alternatively, a part or all of the functions in the steps of FIG. 10 may be executed by hardware such as an ASIC or an electronic circuit. Note that the symbol "S" in the explanation of each process means that it is a step in the flowchart (the same applies hereinafter in the present specification). Further, in the software configuration of the management apparatus 12 illustrated in FIG. 5, this setting process is executed by the printing paper data distribution part 510.

If the setting process is started, first, the CPU 400 selects the printing apparatus 16 to be the target of distribution of printing paper data (S1002). Note that, in S1002, it is possible to select multiple printing apparatuses 16. That is, in S1002, for example, the CPU 400 displays one or more selectable printing apparatuses 16 on the CRT display 418 and selects the printing apparatus 16 based on the user's selection on the displayed display screen. Note that the displayed printing apparatuses 16 are printing apparatuses that are connected to the management apparatus 12 via the network 14 so as to be found in a search process on the network 14. The number of printing apparatuses 16 to be selected based on the user's selection may be one or more. In the present embodiment, the CPU 400 functions as the second selection part that selects the printing apparatus 16 to be the target of distribution of printing paper data.

Next, the CPU 400 selects the type of distribution (S1004). That is, in S1004, for example, the CPU 400 displays "ADD/UPDATE" and "RESTORE" as types of distribution on the CRT display 418 in a selectable manner and selects the type of distribution based on the user's selection on the displayed display screen. In the present embodiment, although the adding and updating are combined as one, the adding and updating may be separated. The type of distribution represents a process to be executed with the distributed printing paper data. The type "ADD" is information for newly adding/setting printing paper data to the printing apparatuses 16, and the type "UPDATE" is information for updating the printing paper data which is set in the printing apparatuses 16, and the type "RESTORE" is information for restoring printing paper data which had been set in the printing apparatuses 16.

Thereafter, the CPU 400 selects a printing paper file including the printing paper data to be distributed according to the selected type of distribution (S1006). That is, in S1006, the CPU 400 displays selectable printing paper files on the CRT display 418 and selects a printing paper file including the printing paper data to be distributed, based on the user's selection on the displayed display screen. In the present embodiment, the CPU 400 functions as the first selection part that selects printing paper data.

Here, the printing paper files to be displayed on the display screen in a selectable manner are filtered by the product IDs or the product group IDs. Specifically, in a case where "ADD/UPDATE" is selected in S1004, printing paper files of which the type 804 is "BASIC PRINTING PAPER" or "CUSTOM PRINTING PAPER" are displayed in a selectable manner. The printing paper files of "BASIC PRINTING PAPER" which are displayed on the display screen are printing paper files whose product IDs 806 match the products ID 604 of the printing apparatuses 16 which are selected as the distribution target, from among the printing paper files which are managed in the printing paper file management part 504. Further, the printing paper files of "CUSTOM PRINTING PAPER" which are displayed on the display screen are printing paper files whose product group IDs 808 match the product group IDs 606 of the printing apparatuses 16 which are selected as the distribution target, from among the printing paper files which are managed in the printing paper file management part 504. On the other hand, in a case where "RESTORE" is selected in S1004, printing paper files whose type 804 is "BACKUP PRINTING PAPER" are displayed in a selectable manner. The files of "BACKUP PRINTING PAPER" which are displayed on the display screen are printing paper files whose product IDs 806 match the products ID 604 of the printing apparatuses 16 which are selected as the distribution target, from among the printing paper files which are managed in the printing paper file management part 504. Note that the information of the printing apparatuses 16 is obtained from the printing apparatus DB 516. As described above, in the present embodiment, the printing paper data to be distributed is set on a per printing paper file basis. Further, in the above-described explanation, although the case of using the product IDs 806 and the product group IDs 808 of printing paper files is explained, it is also possible to use the product IDs 706 and the product group IDs 708 of the file identification information in the printing paper file DB 512.

The display method for displaying printing paper files in a selectable manner is not limited to the description above. That is, it is also possible to display all the printing paper files based on the types 804. Specifically, in a case where "ADD/UPDATE" is selected, all the printing paper files whose type 804 is "BASIC PRINTING PAPER" or "CUSTOM PRINTING PAPER" are displayed, from among the printing paper files which are managed by the printing paper file management part 504. Further, in a case where "RESTORE" is selected, all the printing paper files whose type 804 is "BACKUP PRINTING PAPER" are displayed, from among the printing paper files which are managed by the printing paper file management part 504.

Then, if a printing paper file of "BASIC PRINTING PAPER" or "BACKUP PRINTING PAPER" is selected, the printing paper file can be selected only in a case where the product ID 806 of the printing paper file matches the product ID 604 of the printing apparatus 16 to be the distribution target. Further, if a printing paper file of "CUSTOM PRINTING PAPER" is selected, the file can be selected only in a case where the product group ID 808 of the printing paper file matches the product group ID 606 of the printing apparatus 16 to be the distribution target. Note that, in a case where the product IDs or product group IDs do not match, even if such a printing paper file is selected, a notification that the printing paper file cannot be selected or cannot be distributed and a notification for prompting to select a printing paper file again will be provided.

If the selection of a printing paper file is completed in this way, the CPU 400 next determines a schedule, which will be the distribution time, for distributing the printing paper file which is selected in S1006 to the printing apparatuses 16 which are selected in S1002 (S1008). Here, it is possible that options such as "IMMEDIATELY" or "AFTER A PREDETERMINED TIME" will be presented for allowing the user to select the options, so that the distribution time according to the selected option will be set as the schedule. Alternatively, it is also possible to allow the user to enter a specific time for executing the distribution, so that the entered distribution time will be set as the schedule. In the present embodiment, the CPU 400 functions as a setting part that sets a distribution time of printing paper data.

Thereafter, the information selected (and determined) in S1002 to S1008 is registered as setting information (S1010). The setting information is stored in a storage area such as the RAM 404. Then, the CPU 400 determines whether or not to perform setting for another distribution (S1012) and returns the processing to S1002 if it is determined that the setting will be performed. Further, if it is determined that the setting will not be performed, this setting process will be ended.

In this way, the setting information registered by the setting process includes information related to the printing apparatus 16 to be the distribution target, information related to the distribution type, a printing paper file including the printing paper data to be delivered, i.e., information related to the printing paper data, and information related the distribution schedule. The registered setting information is displayed on the CRT display 418, so that the user can check the setting information on the management screen. The display of the management screen on the CRT display 418 is controlled by the CPU 400. In the present embodiment, the CPU 400 functions as a display part that displays various kinds of information which is set in the setting process on a display device.

FIG. 11 is a diagram illustrating the management screen 1100 for setting information. On the management screen 1100, the file name 704 of a printing paper file is displayed in the file name field 1102 as the information related to the printing paper file including the printing paper data to be distributed. Further, on the management screen 1100, any of "BASIC PRINTING PAPER", "CUSTOM PRINTING PAPER", and "BACKUP PRINTING PAPER" is displayed in the type field 1104 as the information related to the distribution type. Further, on the management screen 1100, the product name 608 of the printing apparatus 16 is displayed in the distributable model field 1106 as the information related to the printing apparatus 16 to be the distribution target. Furthermore, on the management screen 1100, the date and time when the distribution process will be executed is displayed in the update date and time field 1108 as the information related to the distribution schedule.

Note that, although not illustrated in the drawings, it is also possible that this management screen 1100 includes, for example, a button for adding new setting information, a button for deleting registered setting information, a button for selecting each setting information, etc. By using the management screen 1100 as such, it becomes easy to manage the setting information.

Note that, in the present embodiment, the management apparatus 12 can execute a conversion process for converting the printing paper data to be distributed into the printing paper data corresponding to the printing apparatus of the distribution destination. As described above, the conversion process is a process of converting at least a part of the information in printing paper data so as to become compatible with the printing apparatus of the distribution destination. In the meantime, since a lot of resources of the CPU 400 that executes the conversion process and the memory (the ROM or the RAM) in which the data is loaded in the conversion process are utilized in the conversion process, the load on the management apparatus 12 in the conversion process is large. This problem can occur more prominently in such a form as in the present embodiment, in which printing paper data can be distributed to multiple printing apparatuses with a single setting. Therefore, it is not preferable that the conversion process is executed during the time zone in which the user is using the management apparatus 12 and the management apparatus 12 is likely to immediately execute the process with a user's instruction.

Further, although the conversion process is executed for each printing apparatus of the distribution destination, the distribution may not be performed immediately after the setting of distribution. Specifically, depending on the setting of distribution, the time after an elapse of a certain amount of time from the time of setting the distribution may be set as the schedule. In the form where the conversion process is executed immediately after the setting of distribution, there is a problem that, in a case where the distribution is not performed immediately after the setting of distribution, the management apparatus 12 must keep holding the converted printing paper data until the distribution. This problem can occur more prominently in such a form as in the present embodiment, in which printing paper data can be distributed to multiple printing apparatuses with a single setting (that is, a form in which a number of converted printing paper data can be generated with a single setting).

Therefore, in the present embodiment, even if the management apparatus 12 sets the distribution schedule, the printing apparatus of the distribution destination, and the printing paper data to be distributed according to a user's instruction, the management apparatus 12 does not immediately execute the conversion process. Then, the management apparatus 12 executes the conversion process immediately before the distribution, based on the set distribution schedule. This is because, for example, in general, a time zone such as midnight in which the user is unlikely to utilize the management apparatus 12 is set as the distribution schedule. Further, it is because the time period in which the converted printing paper data is held can be shortened accordingly. Note that there is not a limitation to a form in which the timing of executing the conversion process is based on the distribution schedule, and, for example, such a form in which the conversion process is definitely executed during a time period where it is highly likely that the user does not utilize the management apparatus 12 is also possible. Further, for example, if the set distribution schedule is a predetermined time zone such as a midnight time zone, the conversion process will be executed immediately before the distribution, based on the set distribution schedule. On the other hand, such a form in which, if the set distribution schedule is not in the predetermined time zone, the conversion process will be executed in the predetermined time zone without being based on the set distribution schedule is also possible.

Note that, since the above-described problem can occur even in the form of distributing printing paper data to one printing apparatus with a single setting, it is needless to say that the control in the present embodiment is applicable to the form in which printing paper data is distributed to one printing apparatus with a single setting.

<Distribution Process>

The CPU 400 manages the setting information and, based on the distribution schedule in the setting information, performs a distribution process in which the printing paper data included in a printing paper file which is set in the setting information is distributed to the printing apparatus 16 which is set in the setting information. In the present embodiment, the CPU 400 functions as a distribution part that distributes printing paper data, based on various kinds of information which is set in a setting process.

Figure 12:
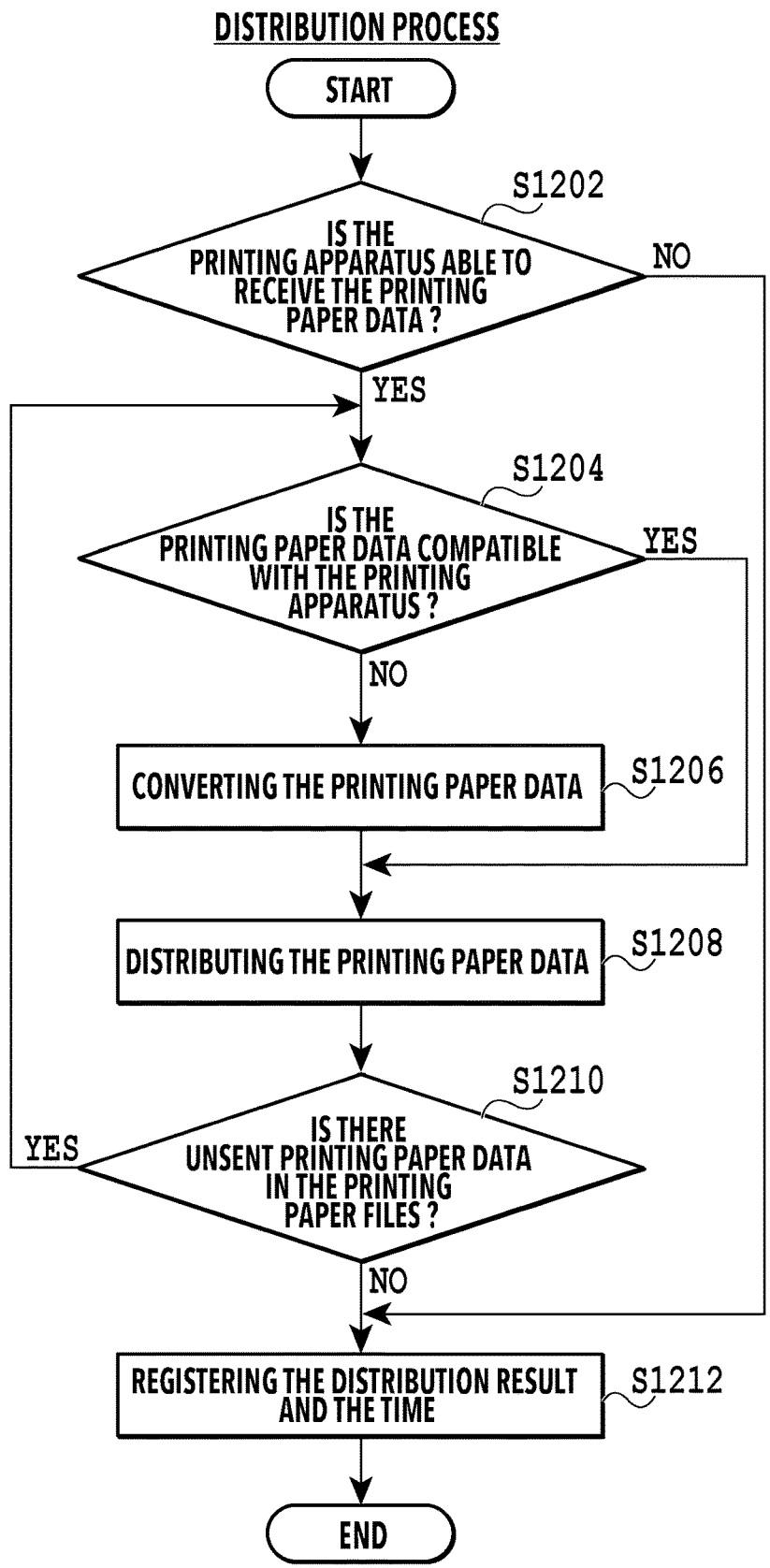
FIG. 12 is a flowchart illustrating details of processing of a distribution process based on the setting information in the setting process of FIG. 10.

FIG. 12 is a flowchart illustrating details of processing of the distribution process. The series of the processes illustrated in the flowchart of FIG. 12 is performed by the CPU 400 loading a program code stored in the ROM 402 (or the HDD 406) into the RAM 404 and executing the program code. Alternatively, a part or all of the functions in the steps of FIG. 12 may be executed by hardware such as an ASIC or an electronic circuit. Further, in the software configuration of the management apparatus 12 illustrated in FIG. 5, this distribution process is executed by the printing paper data distribution part 510 and the printing paper data conversion part 518. Further, it is assumed that the processing of the present flowchart is executed at the timing corresponding to the set schedule, based on the arrival of the time corresponding to the schedule which is set as described above. However, there is not a limitation to this form, and it is also possible that the processing of the present flowchart is started at a predetermined time before the time corresponding to the set schedule in consideration of the time to be taken for various kinds of processes required for distribution.

Here, in a case where multiple printing apparatuses 16 are set as the distribution target in the setting information, the CPU 400 may execute the process of distributing the printing paper data to each printing apparatus 16 in parallel or may perform the process of distributing the printing paper data in order. Further, for example, in a case where the number of printing apparatuses 16 to be the distribution target is large, such as hundreds or thousands, for example, 20 printing apparatuses 16 are grouped as one, respectively, and the process of distributing the printing paper data is performed in parallel for each of the grouped 20 apparatuses. Then, if the processing for one group is completed, the processing for the next group is performed.

If the distribution process is started, first, whether or not the printing apparatus 16 of the distribution target is in a state of being able to receive the printing paper data is determined (S1202). Specifically, whether or not the printing apparatus 16 of the distribution target can perform communication or whether or not a printing process is being executed is determined. That is, in a case where communication is not possible due to factors such as the power being turned off or a printing process being executed, the CPU 400 determines that the printing apparatus 16 of the distribution target is not in a state being able to receive the printing paper data.

If it is determined in S1202 that the printing apparatus 16 of the distribution target is not in a state of being able to receive the printing paper data, the processing proceeds to S1212, which will be described later. Further, in S1202, if it is determined that the printing apparatus 16 of the distribution target is in a state of being able to receive the printing paper data, whether or not the printing paper data included in the printing paper file which is set in the setting information is compatible with the printing apparatus 16 of the distribution target will be determined (S1204). Note that, in S1204, among the printing paper data included in the printing paper files which are set in the setting information, the above-described determination is performed for the printing paper data which has not been distributed to the printing apparatus 16.

Here, the printing paper data includes information that depends on the mechanism of the printing apparatus 16, the characteristics of the head, the characteristics of the ink, etc. Therefore, even if the printing paper data which is set in one printing apparatus 16 is applied to another printing apparatus 16 having different characteristics so that printing is performed based on the printing paper data, there is a possibility that the printing cannot be performed properly. That is, the printing paper data of one printing apparatus 16 is applied to the other printing apparatus 16 to enable proper printing in a case where not only the product group IDs but also the product IDs match. However, regarding the printing paper files whose type 804 is "CUSTOM PRINTING PAPER", one whose product group ID matches that of the printing apparatus 16 of the distribution target is selected, whether or not the product IDs match is not determined.

Therefore, in S1204, regarding the printing paper files whose type 804 is "CUSTOM PRINTING PAPER", whether or not the product ID 806 matches the product ID 604 of the printing apparatus 16 of the distribution target is determined. Then, if it is determined that the product ID 806 does not match the product ID 604 in this determination, it will be determined that the printing paper data included in the printing paper file is not compatible with the printing apparatus 16, and, if it is determined that the product ID 806 matches the product ID 604, it will be determined that the printing paper data included in the printing paper file is compatible with the printing apparatus 16.

Specifically, first, whether or not the type 804 of the printing paper file to be distributed is "CUSTOM PRINTING PAPER" is determined. If it is determined that the type 804 is not "CUSTOM PRINTING PAPER" in the determination, it will be determined that the printing paper data is compatible with the printing apparatus 16, and the processing proceeds to S1208, which will be described later. That is, regarding the printing paper files whose type 804 is "BASIC PRINTING PAPER" or "BACKUP PRINTING PAPER", one having the product ID that matches that of the printing apparatus 16 of the distribution target is selected in the setting process, and thus the printing paper data is compatible with the printing apparatus 16. On the other hand, if it is determined that the type 804 is "CUSTOM PRINTING PAPER" in the above-described determination, whether or not the product ID 806 of the printing paper file to be distributed matches the product ID 604 of the printing apparatus 16 of the distribution target will be determined. If it is determined that the product ID 806 matches the product ID 604 in the determination, it will be determined that the printing paper data is compatible with the printing apparatus 16, and the processing proceeds to S1208, which will be described later. Further, if it is determined that the product ID 806 does not match the product ID 604 in the determination, it will be determined that the printing paper data is not compatible with the printing apparatus 16, and the processing proceeds to S1206, so that the CPU 400 performs conversion of the printing paper data.

In S1206, the CPU 400 converts the printing paper data so as to become applicable to the printing apparatus 16 of the distribution target (executes the above-described conversion process) and then proceeds the processing to S1208. In the meantime, a printing paper file whose type 804 is "CUSTOM PRINTING PAPER" is created by customizing at least a part of the information of the printing paper data in a printing paper file whose type 804 is "BASIC PRINTING PAPER". Here, it is assumed that a part of the information of a predetermined printing paper data is changed based on a printing paper file of which the product ID is "1" and the type 804 is "BASIC PRINTING PAPER", so that a printing paper file of which the type 804 is "CUSTOM PRINTING PAPER" is created. In this case, the reference printing paper data ID of the printing paper data in the printing paper file whose type is "CUSTOM PRINTING PAPER", which corresponds to the predetermined printing paper data, is the printing paper data ID of the predetermined printing paper data of a printing paper file whose type 804 is "BASIC PRINTING PAPER", which is used as the base.

In a case of distributing such a printing paper file whose type is "CUSTOM PRINTING PAPER" to the printing apparatuses 16 whose product ID is "2", the file identification information with the product ID 706 being "2" and the type 710 being "BASIC PRINTING PAPER" is firstly obtained from the printing paper file DB 512 in S1206. Next, based on the printing paper file IDs 702 in the obtained file identification information, the CPU 400 automatically obtains the printing paper data of printing paper files of which the product ID 806 is "2" and the type 804 is "BASIC PRINTING PAPER" from the printing paper file saving part 506. Note that, in a configuration where the printing apparatus 16 of the distribution target is designated, then the printing paper data to be distributed is designated, and then the printing paper data is distributed to the printing apparatus 16, in a case where there are multiple printing apparatuses 16 as the distribution target, the same procedure must be repeated for each printing apparatus 16, which is a burden for the user. In the present embodiment, usability can be improved in a case where distribution is performed to multiple printing apparatuses 16.

Thereafter, in the printing paper data of the printing paper files whose type is "CUSTOM PRINTING PAPER", the information (predetermined information) which depends on the mechanism of the printing apparatus 16, the characteristics of the head, and the characteristics of the ink is converted into the information in the obtained printing paper data. The obtained printing paper data described above is printing paper data obtained from the printing paper file of which the type is "BASIC PRINTING PAPER" and the product ID matches that of the printing apparatus of the distribution target. Note that the information which depends on the mechanism of the printing apparatus 16, the characteristics of the head, and the characteristics of the ink is the paper feed adjustment value 924, the head height 926, the image processing data 928, etc. When converting the printing paper data, the information to be converted may be different for each product group ID 606 of the printing apparatus 16 and it is also possible that the information is held in advance as a table for each product group ID, for example.

In S1208, the CPU 400 distributes the printing paper data. Specifically, the printing paper data converted in S1206 (the converted printing paper data) or the printing paper data not converted in S1206 is distributed to the printing apparatuses 16 of the distribution target. Note that, in S1208, the information related to the type of distribution selected in S1004 is also distributed together with the printing paper data. Therefore, in the printing apparatus 16 that has received the information related to the type of distribution together with the printing paper data, for example, the CPU 200, which also functions as the setting part, sets the printing paper data based on the information related to the type. For example, if the information related to the type is "ADD/UPDATE", the printing paper data will be added or updated, and, if the information related to the type is "RESTORE", the corresponding printing paper data will be replaced with the distributed printing paper data for restoration.

Thereafter, the CPU 400 determines whether or not there is unsent printing paper data in the printing paper files which are set in the setting information (S1210), and, if it is determined that there is unsent printing paper data in the printing paper files, the processing returns to S1204. If it is determined in S1210 that there is no unsent printing paper data in the printing paper files, the CPU 400 registers the distribution result and the distribution time in the distribution state 618 of the printing apparatus DB 516 (S1212) and ends this distribution process. In S1212, if distribution of all the printing paper data included in the printing paper files has succeeded, "SUCCEEDED" is registered, and, if distribution of even one of the printing paper data has failed, "FAILED" is registered. The distribution time may be the time when the distribution of the printing paper data is started or the time when the distribution is ended. Further, if it is determined in S1202 that the printing apparatus 16 is not in a state of being able to receive the printing paper data, "UNSENT" is registered as the distribution result in S1212, and the distribution time is blank.

As explained above, in the management system 10 equipped with a management apparatus according to the first embodiment, the printing apparatus 16 to be the distribution target, the printing paper file including the printing paper data to be distributed, and the type of distribution are selected, and the schedule of the distribution of the printing paper data to the printing apparatus 16 is determined. Then, the printing paper data is distributed based on the information selected and determined in this way. Accordingly, it becomes possible to individually set and distribute the printing paper data to be distributed to the printing apparatus 16.

Further, in a case where the printing paper file whose type is "CUSTOM PRINTING PAPER" is selected and the printing paper data is distributed to the printing apparatus 16 whose product ID is different from the product ID of the printing paper file, the printing paper data corresponding to the product ID of the printing apparatus 16 is obtained so as to convert the printing paper data to be distributed. Accordingly, with the configuration in which scheduled distribute to the printing apparatuses 16 of multiple product IDs can be performed, the burden for the user in management of printing paper data of multiple apparatuses and multiple product IDs is reduced, compared to the conventional technologies in which the flow of designating and distributing printing paper data must be repeated for the number of apparatuses for distribution.

Therefore, in the management system 10 equipped with a management apparatus according to the first embodiment, even if various types of printing apparatuses 16 are mixed, unified distribution management of printing paper data can be easily performed.

Second Embodiment

Next, with reference to FIG. 13 through FIG. 16, an explanation will be given of a management apparatus according to the second embodiment. Note that, in the following explanation, the same or corresponding configurations as those of the first embodiment described above are assigned with the same reference signs as those used in the first embodiment, so as to omit the detailed explanations thereof.

The second embodiment is different from the above-described first embodiment in an aspect that "DELETE" can be selected as the type of distribution in the setting process, in addition to "ADD/UPDATE" and "RESTORE".

<Management List DB>

First, an explanation will be given of the management list DB 514 which is managed by the printing paper data management part 508. FIG. 13 is a diagram illustrating data identification information for identifying printing paper data which is held in the management list DB 514.

The data identification information 1300 held in the management list DB 514 includes the printing paper ID 1302, the printing paper data name 1304, the source type 1306, the source ID 1308, and the name 1310. That is, the printing paper data management part 508 manages the printing paper data, based on the data identification information including the above-described information. Note that the information included in the data identification information is not limited to the above-described information, and the kinds thereof may be increased or decreased as appropriate.

The printing paper ID 1302 matches the printing paper ID 910 of printing paper data. The printing paper data name 1304 matches the printing paper data name 916 of printing paper data. The source type 1306 is information with which the type of the registration source of printing paper data to be managed can be determined. Specifically, the source type 1306 is information with which whether the registration source of printing paper data is a printing paper file or a reference printing apparatus can be determined. If printing paper data is obtained from a printing paper file, "PRINTING PAPER FILE" is registered. Further, if printing paper data is obtained from a reference printing apparatus, "REFERENCE PRINTING APPARATUS" is registered. The method of updating the source type 1306 will be described later.

The source ID 1308 is information with which the printing paper file or printing apparatus 16 which is the registration source of printing paper data can be identified. If the source type 1306 is the "REFERENCE PRINTING APPARATUS", the printing apparatus ID 602 of the printing apparatus 16 that is a reference printing apparatus is set as the source ID 1308. Further, if the source type 1306 is "PRINTING PAPER FILE", the printing paper file ID 702 is set as the source ID 1308. The name 1310 is information indicating the name of the printing paper file or printing apparatus 16 which is the registration source of printing paper data. If the source type 1306 is "REFERENCE PRINTING APPARATUS", the product name 608 of the printing apparatus 16 that is a reference printing apparatus is set as the name 1310. Further, if the source type 1306 is "PRINTING PAPER FILE", the file name 704 is set as the name 1310.

Note that the management list DB 512 may hold only the data identification information 1300 of printing paper data or may hold printing paper data together with the data identification information 1300.

<Update Process for the Management List DB>

If a printing paper file is registered in the printing paper file management part 504, the printing paper file management part 504 calls the printing paper data management part 508. Further, if the reference printing apparatus 616 of the printing apparatuses 16 is set to "ON" in the printing apparatus management part 500, the printing apparatus management part 500 calls the printing paper data management part 508. Then, the printing paper data management part 508 starts the update process for updating data identification information in the management list DB 514 in response to a call from the printing paper file management part 504 and the printing apparatus management part 500.

Figure 14:
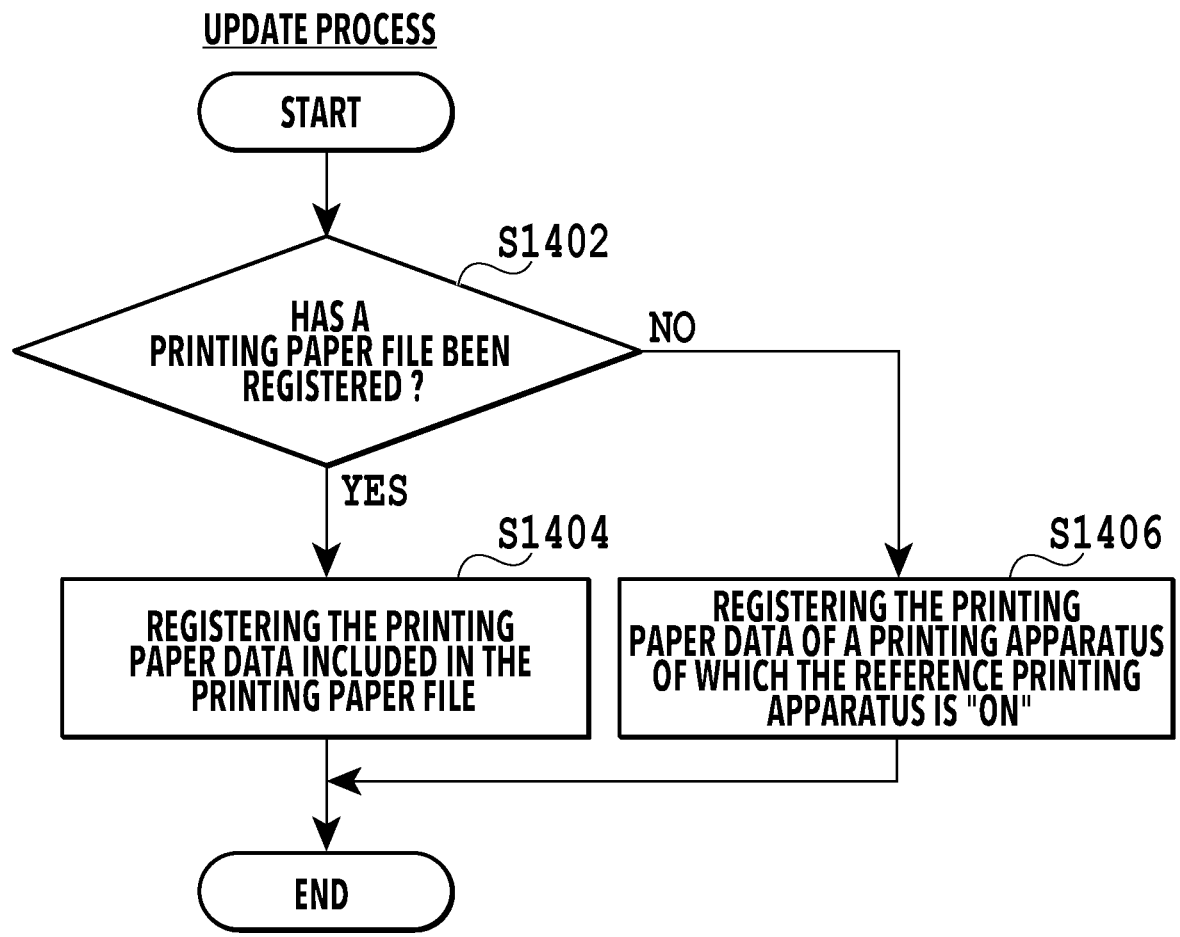
FIG. 14 is a flowchart illustrating details of processing of an update process.

FIG. 14 is a flowchart illustrating details of processing of the update process. The series of the processes illustrated in the flowchart of FIG. 14 is performed by the CPU 400 loading a program code stored in the ROM 402 (or the HDD 406) into the RAM 404 and executing the program code. Alternatively, a part or all of the functions in the steps of FIG. 14 may be executed by hardware such as an ASIC or an electronic circuit.

If the update process is started, the CPU 400 first determines whether or not a printing paper file has been registered (S1402). That is, in S1402, whether or not there was a call from the printing paper file management part 504 is determined. If it is determined that there was a call from the printing paper file management part 504, it will be determined that a printing paper file has been registered. Further, if it is determined that there was a call from the printing apparatus management part 500, it will be determined that the reference printing apparatus 616 is set to "ON", and it will be determined that printing paper files have not been registered.

If it is determined in S1402 that a printing paper file has been registered, the CPU 400 creates the data identification information 1300 for the printing paper data included in the registered printing paper file and registers the data identification information 1300 in the management list DB 514 (S1404), and then this update process is ended. Specifically, first, the printing paper files which are held in the printing paper file saving part 506 are loaded via the printing paper file management part 504. Next, the newly registered printing paper file is obtained from the held printing paper files. Then, the data identification information of the printing paper data included in the obtained printing paper file is created and registered in the management list DB 514. Here, it is also possible that the printing paper data is also registered in the management list DB 514.

On the other hand, if it is determined in S1402 that printing paper files have not been registered, the printing paper data which is set in the printing apparatus 16 of which the reference printing apparatus 616 is set to "ON" is registered in the management list DB 514 by the CPU 400 (S1406). Then, this update process is ended. Specifically, in S1406, first, in the printing apparatus DB 516 of the printing apparatus management part 500, the printing apparatus 16 is specified based on the printing apparatus ID 602 of the printing apparatus 16 of which the reference printing apparatus 616 is "ON". Then, by accessing the specified printing apparatus 16, the printing paper data which is set in the printing apparatus 16 is obtained. Thereafter, the data identification information 1300 for the obtained printing paper data is created and registered in the management list DB 514. Here, it is also possible that the printing paper data is also registered in the management list DB 514.

<Setting Process>

In the above configuration, it is possible for the user to delete printing paper data which is set in the printing apparatuses 16 via the management apparatus 12, in addition to newly adding printing paper data to the printing apparatuses 16 and updating or restoring set printing paper data. Hereinafter, the setting process and the distribution process in the present embodiment will be explained in detail.

Figure 15B:
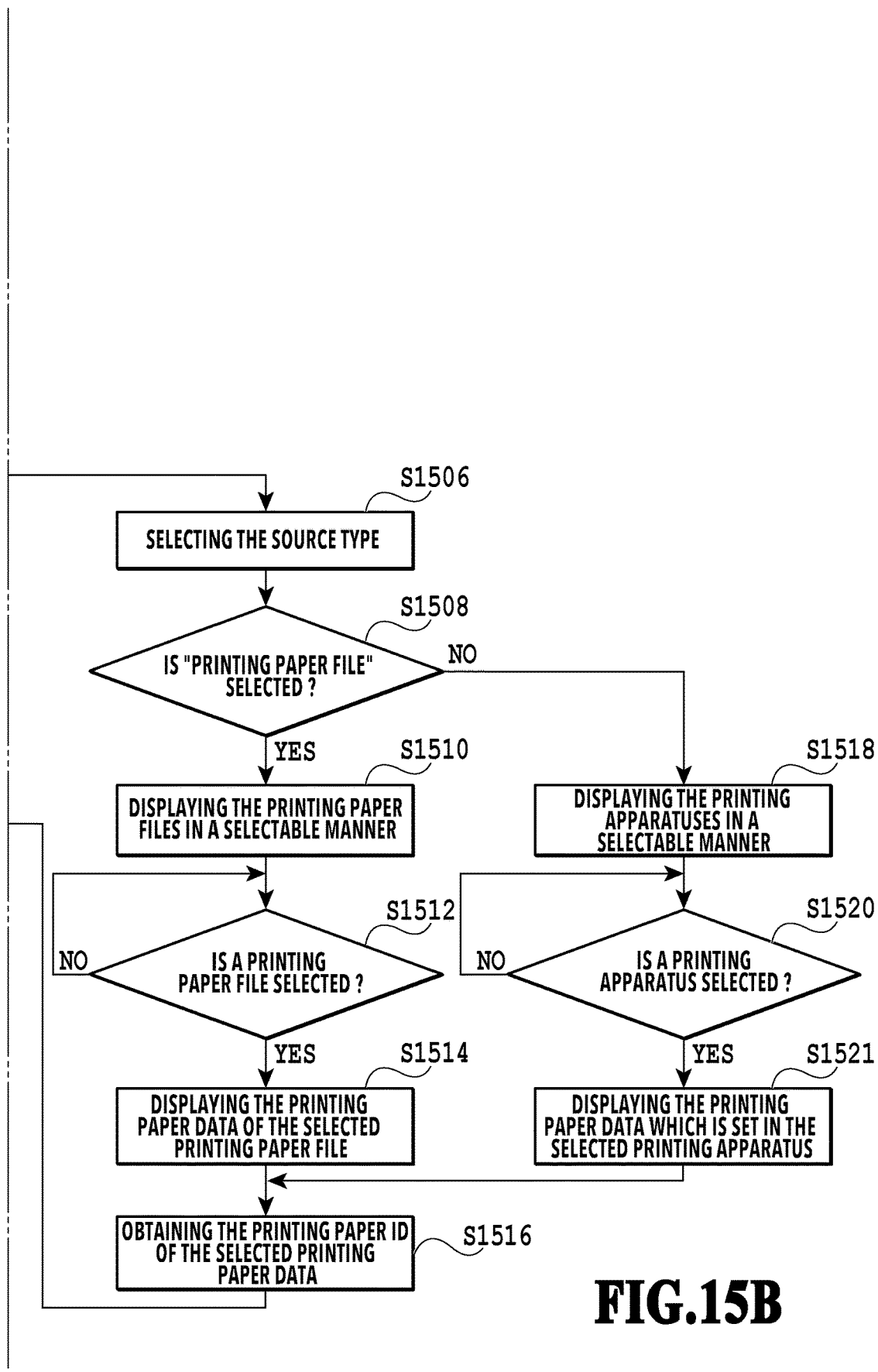

FIG. 15 is a flowchart illustrating details of processing of the setting process executed by the management apparatus 12 according to the second embodiment. The series of the processes illustrated in the flowchart of FIG. 15 is performed by the CPU 400 loading a program code stored in the ROM 402 (or the HDD 406) into the RAM 404 and executing the program code. Alternatively, a part or all of the functions in the steps of FIG. 15 may be executed by hardware such as an ASIC or an electronic circuit. Note that, in the software configuration of the management apparatus 12 illustrated in FIG. 5, this setting process is executed by the printing paper data distribution part 510 and the printing paper data presenting part 520. Further, in the setting process of FIG. 15, the parts where the details of processing are the same as those of the setting process of FIG. 10, the same step numbers are used, so that detailed explanation thereof will be omitted as appropriate.

If the setting process is started and the printing apparatus 16 to be the distribution target of printing paper data is selected in S1002, the CPU 400 selects the type of distribution (S1502). That is, in S1504, for example, the CPU 400 displays "ADD/UPDATE", "RESTORE", and "DELETE" as the types on the CRT display 418 in a selectable manner and selects the type based on the user's selection on the displayed display screen. Note that the type "DELETE" is information for deleting printing paper data.

Next, the CPU 400 determines whether or not "DELETE" is selected as the type in S1502 (S1504). If it is determined in S1504 that "DELETE" is not selected, it means that "ADD/UPDATE" or "RESTORE" is selected, so that the processing proceeds to S1006, and, thereafter, the same processing as in the above-described first embodiment is executed. Note that, in the present embodiment, the processing to be executed if "ADD/UPDATE" or "RESTORE" is selected is not limited to the same as that of the above-described first embodiment, and it is also possible that the processing is performed on the printing paper data which is set in the printing apparatus 16 by use of various kinds of publicly-known technologies.

On the other hand, if it is determined in S1504 that "DELETE" is selected, the user is prompted to select the source type (S1506), and the CPU 400 determines whether or not "PRINTING PAPER FILE" is selected in the selection (S1508). Specifically, in S1506, the user is prompted to select whether the printing paper data to be deleted is printing paper data included in a printing paper file which is managed by the management apparatus 12 or printing paper data which is set in the printing apparatus 16 that is a reference printing apparatus. In S1506, for example, the CPU 400 displays "PRINTING PAPER FILE" and "REFERENCE PRINTING APPARATUS" on the CRT display 418 in a selectable manner. Then, in S1508, whether or not "PRINTING PAPER FILE", which indicates that selection is performed from the printing paper data included in printing paper files managed by the management apparatus 12, is selected is determined.

If it is determined in S1508 that "PRINTING PAPER FILE" is selected, the CPU 400 displays the target printing paper files in a selectable manner (S1510). That is, in S1510, the printing paper files managed by the printing paper file management part 504 are displayed in a selectable manner, and the user is prompted to perform selection from the printing paper files. Specifically, in S1510, first, in the management list DB 514, all the data identification information 1300 whose source type 1306 is "PRINTING PAPER FILE" is obtained. Then, the source ID 1308 is obtained from each of the obtained data identification information 1300. Here, in the data identification information 1300, since the source type 1306 is "PRINTING PAPER FILE", the source ID 1308 matches the printing paper file ID 702 of the file identification information 700. Therefore, the file identification information 700 whose printing paper file ID 702 matches the obtained respective source ID 1308, which is held in the printing paper file DB 512, is obtained, and the file names 704 of the obtained file identification information 700 are displayed on the CRT display 418 in a selectable manner.

Next, the CPU 400 determines whether or not a printing paper file is selected (S1512). If it is determined in S1512 that a printing paper file is selected, the CPU 400 obtains the printing paper data of the printing paper file, which is identified by the file identification information 700 including the selected file name, from the management list DB 514 and displays the printing paper data in a selectable manner (S1514). In S1514, for example, the printing paper data name 1304 of the obtained printing paper data is displayed in a list on the CRT display device in a selectable manner.

Thereafter, the CPU 400 selects the printing paper data, which is selected by the user, as the printing paper data to be deleted and obtains the printing paper ID 910 of the printing paper data to be deleted (S1516). If the printing paper ID of the printing paper data to be deleted is obtained in this way, the processing proceeds to S1008, so that the schedule for distributing the obtained information is determined, and, in S1010, the information selected and determined in the processing so far is registered as the setting information. Specifically, in S1010, the information selected in S1002, S1502, and S1516 and the information determined in S1008 are registered as the setting information. Then, in S1012, whether or not to perform setting for another distribution is determined, and, if it is determined that the setting is not performed, this setting process will be ended.

Further, in S1508, if it is determined that "PRINTING PAPER FILE" is not selected, that is, if it is determined that "REFERENCE PRINTING APPARATUS" is selected, the CPU 400 displays the target printing apparatuses 16 in a selectable manner (S1518). That is, in S1518, the printing apparatuses 16 managed by the printing apparatus management part 500 are displayed in a selectable manner. Specifically, in S1518, first, in the management list DB 514, the data identification information 1300 whose source type 1306 is "REFERENCE PRINTING APPARATUS" is obtained.

Then, the source ID 1308 is obtained from the obtained data identification information 1300. Here, in the data identification information 1300, since the source type 1306 is "REFERENCE PRINTING APPARATUS", the source ID 1308 matches the printing apparatus ID 602 of the apparatus identification information 600. Therefore, the apparatus identification information 600 whose printing apparatus ID 602 matches the obtained source ID 1308, which is held in the printing apparatus DB 516, is obtained, and the product name 608 of the obtained apparatus identification information 600 is displayed on the CRT display 418 in a selectable manner.

Next, the CPU 400 determines whether or not the printing apparatus 16 is selected (S1520). If it is determined in S1520 that the printing apparatus 16 is selected, the CPU 400 obtains the printing paper data of the printing apparatus identified by the apparatus identification information 600, which includes the selected product name, from the management list DB 514 and displays the printing paper data in a selectable manner (S1522). In S1522, for example, the printing paper data name 1304 of the obtained printing paper data is displayed on the CRT display display device in a selectable manner. Subsequently, the processing proceeds to S1516, and, thereafter, the same processing as when a printing paper file is selected in S1508 will be performed.

<Distribution Process>

The CPU 400 manages the setting information and, based on the distribution schedule in the setting information, performs a distribution process in which the printing paper data included in a printing paper file which is set based on the setting information is distributed to the printing apparatus 16 which is set in the setting information. In the present embodiment, the CPU 400 functions as a distribution part that distributes printing paper data, based on various kinds of information which is set in a setting process. Further, in the present embodiment, the processing explained in the above-described first embodiment or publicly-known processing is applied to the distribution process with the setting information in which the type of distribution is "ADD/UPDATE" or "RESTORE". Therefore, in the following explanation, the distribution process for distributing the setting information in which the type of distribution is "DELETE" will be explained.

Figure 16:
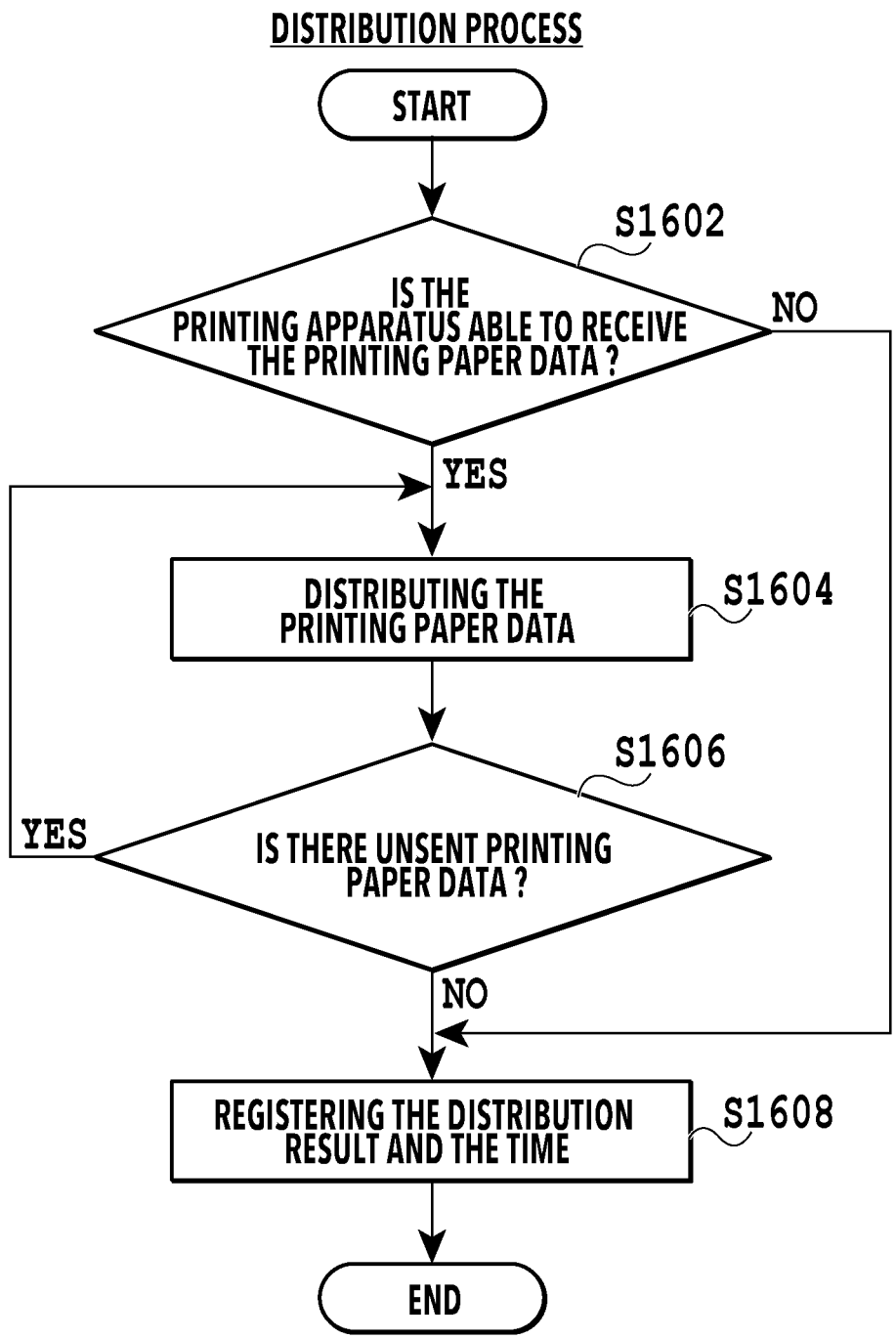
FIG. 16 is a flowchart illustrating details of processing of a distribution process based on the setting information in which the type of distribution is "DELETE".

FIG. 16 is a flowchart illustrating details of processing of the distribution process in which printing paper data is distributed based on the setting information in which the type of distribution is "DELETE". The series of the processes illustrated in the flowchart of FIG. 16 is performed by the CPU 400 loading a program code stored in the ROM 402 (or the HDD 406) into the RAM 404 and executing the program code. Alternatively, a part or all of the functions in the steps of FIG. 16 may be executed by hardware such as an ASIC or an electronic circuit. Further, in the software configuration of the management apparatus 12 illustrated in FIG. 5, this distribution process is executed by the printing paper data distribution part 510.

Regarding the distribution process illustrated in FIG. 16, as with the distribution process illustrated in FIG. 12, the printing paper data may be distributed to multiple printing apparatuses 16 in parallel or may be distributed in order. Further, for example, in a case where the distribution process is performed on hundreds or thousands of printing apparatuses 16, the processes are sequentially executed in order for a unit of a predetermined number of apparatuses.

If the distribution process is started, first, whether or not the printing apparatus 16 of the distribution target is in a state of being able to receive the printing paper data is determined (S1602). Note that, since the specific details of processing of S1602 are the same as those of S1202 described above, the explanations thereof will be omitted.

If it is determined in S1602 that the printing apparatus 16 of the distribution target is not in a state of being able to receive the printing paper data, the processing proceeds to S1608, which will be described later. Further, in S1602, if it is determined that the printing apparatus 16 of the distribution target is in a state of being able to receive the printing paper file, the printing paper data which is set in the setting information is distributed to the printing apparatus 16 of the distribution target (S1604). Specifically, regarding the printing paper data that has not been distributed yet, the printing paper ID 1302 is distributed as information related to the printing paper data in S1604. Further, in S1604, "DELETE", which is information related to the type of distribution, is distributed. Therefore, the printing apparatus 16 that has received the information related to the type of distribution together with the printing paper data "deletes" the received printing paper data.

Thereafter, the CPU 400 determines whether or not there is unsent printing paper data in the printing paper data which is set in the setting information (S1606), and, if it is determined that there is unsent printing paper data, the processing returns to S1604. If it is determined in S1606 that there is no unsent printing paper data, the CPU 400 registers the distribution result and the distribution time in the distribution state 618 of the printing apparatus DB 516 (S1608) and ends this distribution process. Note that, since the specific details of processing of S1608 are the same as those of S1212 described above, the explanations thereof will be omitted.

Note that, in the distribution process of FIG. 16, although the unsent printing paper data is distributed one by one to the printing apparatus 16 together with the information related to the type of distribution, there is not a limitation as such. That is, it is also possible to create a list of printing paper data to be distributed, so as to distribute the list to the printing apparatus 16 as the information related to the list of printing paper data together with the information related to the type of distribution. Alternatively, it is also possible to create a list of printing paper data which is set in the printing apparatus 16, so as to distribute a list excluding the printing paper data which is set in the setting information to the printing apparatus 16.

As explained above, in the management system 10 equipped with a management apparatus according to the second embodiment, at the timing where a printing paper file is registered, the printing paper data included in the printing paper file is managed by the printing paper data management part 508. Further, at the timing where the printing apparatus 16 is set as a reference printing apparatus, the printing paper data which is set in the printing apparatus 16 is managed by the printing paper data management part 508. Moreover, when deleting printing paper data, the printing paper data to be deleted is selected from the printing paper data managed by the printing paper data management part 508 together with the target printing apparatus 16, the type of distribution, etc. Accordingly, in addition to the functional effects of the above-described first embodiment, it is possible to easily delete specific printing paper data in a selective manner from the target printing apparatus 16.

OTHER EMBODIMENTS

In the above-described second embodiment, although the case in which deletion is selected as the type of distribution has been described, the printing paper data on which calibration is executed can be set by performing the same processing, for example. Specifically, it is possible to select "CALIBRATION" as the type of distribution. Then, when "CALIBRATION" is selected, the printing paper data on which the calibration is executed is selected, then "CALIBRATION" is set as the type of distribution, and then the setting information in which the printing paper data on which the calibration is executed is set is registered. Thereafter, if the distribution process is executed based on the distribution schedule of the setting information and the printing apparatus 16 of the distribution target is capable of performing communication, "CALIBRATION" is distributed to the printing apparatus 16 as the information related to the type together with the printing paper data. The printing apparatus 16 that receives the information is set so as to execute calibration on the printing paper data. Note that, not limited to execution of calibration, it is also possible to designate execution conditions of calibration, such as the interval for executing calibration.

Further, in the above-described embodiments, although the schedule for distributing printing paper data is determined, such a function does not have to be provided in particular, and it is also possible to have such a form in which distribution is executed immediately after selecting the printing apparatus 16 of the distribution target, the type of distribution, and the printing paper data (printing paper file).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-179685, filed Oct. 27, 2020, which is hereby incorporated by reference herein in its entirety.

What is claimed is:

1. A control method of a distribution apparatus capable of distributing print medium data, which is data related to printing by use of a print medium, the control method comprising:
    specifying a first printing apparatus to be a distribution destination of first print medium data;
    specifying a second printing apparatus to be a distribution destination of second print medium data;
    executing a setting related to a distribution time;
    executing a conversion process, in which the second print medium data is generated by converting at least a part of first print medium data based on information related to the specified second printing apparatus, at a time based on the executed setting related to the distribution time; and
    distributing the first print medium data to the specified first printing apparatus at a time based on the executed setting related to the distribution time and distributing the second print medium data, which is generated in the conversion process, to the specified second printing apparatus at a time based on the executed setting related to the distribution time.

2. The control method according to claim 1,
    wherein, the specified second printing apparatus is a printing apparatus which is not compatible with the first print medium data, and
    wherein, the specified first printing apparatus is a printing apparatus which is compatible with the first print medium data.

3. The control method according to claim 2, further comprising
    selecting at least one of a plurality of print medium data,
    wherein the first print medium data is the selected print medium data.

4. The control method according to claim 3,
    wherein the plurality of print medium data includes print medium data which is compatible with the printing apparatus if the printing apparatus is capable of executing printing with a predetermined number of colors and is not compatible with the printing apparatus if the printing apparatus is not capable of executing printing with the predetermined number of colors.

5. The control method according to claim 3,
    wherein the plurality of print medium data includes print medium data which is compatible with the printing apparatus if the printing apparatus is capable of executing printing with a predetermined kind of color and is not compatible with the printing apparatus if the printing apparatus is not capable of executing printing with the predetermined kind of color.

6. The control method according to claim 3,
    wherein the distribution apparatus manages a print medium file including one or more print medium data, and
    wherein the print medium file is selected so at least one of the print medium data is selected.

7. The control method according to claim 2,
    wherein, a plurality of second printing apparatuses are specified, and
    wherein the second print medium data, which is generated in the conversion process, is distributed to the specified plurality of second printing apparatuses, based on the executed setting related to the distribution time.

8. The control method according to claim 1,
    wherein the print medium data is at least one of data for adding information related to the print medium of a predetermined kind to the printing apparatus, data for updating information related to the print medium of the predetermined kind in the printing apparatus, data for deleting information related to the print medium of the predetermined kind from the printing apparatus, and data for restoring information related to the print medium of the predetermined kind in the printing apparatus.

9. The control method according to claim 1,
    wherein the print medium data includes at least one of a parameter to be used for executing printing on printing paper of a predetermined kind, a parameter to be used for conveying printing paper of the predetermined kind, a parameter related to calibration related to printing on printing paper of the predetermined kind, and a parameter related to image processing related to printing on printing paper of the predetermined kind.

10. The control method according to claim 1, further comprising
    deleting the second print medium data after the second print medium data is distributed.

11. The control method according to claim 10,
wherein, even though the second print medium data is deleted, the first print medium data is not deleted and held by the distribution apparatus.

12. The control method according to claim 1,
wherein the print medium is roll paper.

13. The control method according to claim 1,
wherein the conversion process is executed based on an arrival of the distribution time, which is based on the executed setting related to the distribution time.

14. The control method according to claim 1,
wherein the conversion process is executed a predetermined time period prior to the distribution time, which is based on the executed setting related to the distribution time.

15. The control method according to claim 1,
wherein, after the conversion process is executed at the time based on the executed setting related to the distribution time, the second print medium data, which is generated in the conversion process, is distributed to the specified printing apparatus at the time based on the executed setting related to the distribution time.

16. The control method according to claim 1,
wherein the print medium data before the conversion process is distributed to the printing apparatus of a first model, which is compatible with the first print medium data, at the time based on the executed setting related to the distribution time, and the second print medium data is distributed to the printing apparatus that is compatible with the second print medium data at the time based on the executed setting related to the distribution time.

17. A non-transitory computer readable storage medium storing a program for causing a computer to perform a control method of a distribution apparatus capable of distributing print medium data, which is data related to printing by use of a print medium, the control method comprising:
specifying a first printing apparatus to be a distribution destination of first print medium data;
specifying a second printing apparatus to be a distribution destination of second print medium data;
executing a setting related to a distribution time;
executing a conversion process, in which the second print medium data is generated by converting at least a part of first print medium data based on information related to the specified second printing apparatus, at a time based on the executed setting related to the distribution time; and
distributing the first print medium data to the specified first printing apparatus at a time based on the executed setting related to the distribution time and distributing the second print medium data, which is generated in the conversion process, to the specified second printing apparatus at a time based on the executed setting related to the distribution time.

18. A distribution system including a distribution apparatus capable of distributing print medium data, which is data related to printing by use of a print medium and a printing apparatus, the distribution system comprising:
a first specification unit configured to specify a first printing apparatus to be a distribution destination of first print medium data;
a second specification unit configured to specify a second printing apparatus to be a distribution destination of second print medium data;
a setting unit configured to execute a setting related to a distribution time;
a processing unit configured to execute a conversion process, in which the second print medium data is generated by converting at least a part of first print medium data based on information related to the second specified printing apparatus, at a time based on the executed setting related to the distribution time;
a distribution unit configured to distribute the first print medium data to the specified first printing apparatus at a time based on the executed setting related to the distribution time and distribute the second print medium data, which is generated in the conversion process, to the specified second printing apparatus at a time based on the executed setting related to the distribution time; and
a printing unit configured to execute printing based on the setting of the print medium.

19. The distribution system according to claim 18,
wherein the conversion process is executed based on an arrival of the set distribution time.

20. The distribution system according to claim 18,
wherein the conversion process is executed a predetermined time period prior to the set distribution time.

* * * * *